US010583385B2

(12) United States Patent
Stark et al.

(10) Patent No.: US 10,583,385 B2
(45) Date of Patent: Mar. 10, 2020

(54) FILTER HOLDER, FILTER ELEMENT AND FILTER ARRANGEMENT

(71) Applicant: Mann+Hummel GMBH, Ludwigsburg (DE)

(72) Inventors: Dennis Stark, Mauer (DE); Beate Brandt, Altlussheim (DE); Andreas Panni, Oestringen-Odenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 629 days.

(21) Appl. No.: 15/095,131

(22) Filed: Apr. 10, 2016

(65) Prior Publication Data

US 2016/0296868 A1 Oct. 13, 2016

Related U.S. Application Data

(60) Provisional application No. 62/186,841, filed on Jun. 30, 2015.

(30) Foreign Application Priority Data

Apr. 10, 2015 (DE) ........................ 10 2015 004 381

(51) Int. Cl.
*B01D 46/24* (2006.01)
*B01D 46/00* (2006.01)

(52) U.S. Cl.
CPC ..... *B01D 46/2414* (2013.01); *B01D 46/0005* (2013.01)

(58) Field of Classification Search
None
See application file for complete search history.

(56) References Cited

U.S. PATENT DOCUMENTS 4,537,608 A * 8/1985 Koslow ................ B01D 50/002 55/337
5,238,474 A * 8/1993 Kahlbaugh ............ B01D 39/14 55/320
5,893,937 A * 4/1999 Moessinger ....... B01D 46/0004 55/385.3

(Continued)

FOREIGN PATENT DOCUMENTS

CN 104415610 A 3/2015
DE 60311972 T2 11/2007

(Continued)

*Primary Examiner* — Amber R Orlando
*Assistant Examiner* — Brit E. Anbacht
(74) *Attorney, Agent, or Firm* — James Hasselbeck

(57) ABSTRACT

A filter receptacle (2) for a filter element (3) that, transversely to a longitudinal direction (LR) thereof, has an oval cross section, said filter receptacle having a receiving portion (19) for receiving the filter element (3), a fluid inlet (24) for allowing fluid to be filtered (L) into the filter receptacle (2), and a fluid outlet (25) for discharging the fluid (L) filtered with the aid of the filter element (3) from the filter receptacle (2), wherein the fluid outlet (25) is arranged such that an outflow direction (A) of the filtered fluid (L) from the fluid outlet (25) is oriented parallel to the longitudinal direction (LR) of the filter element (3), and wherein the fluid outlet (25) has a circular cross section facing away from the filter element (3) and an oval cross section facing toward the filter element (3).

7 Claims, 32 Drawing Sheets

19
1
23
24
20
L
RO
25
L
2
RL
21
26

(56) References Cited

U.S. PATENT DOCUMENTS 6,149,700 A * 11/2000 Morgan ............ B01D 46/2414 123/198 E
6,416,561 B1 * 7/2002 Kallsen .............. B01D 29/21 55/482
6,511,599 B2 * 1/2003 Jaroszczyk .......... B01D 29/111 210/493.5
7,004,986 B2 * 2/2006 Kopec ............... B01D 46/0004 55/337
7,491,254 B2 * 2/2009 Krisko ............... B01D 45/12 55/337
7,981,183 B2 * 7/2011 Nepsund ........... B01D 46/0004 55/385.3
8,016,903 B2 * 9/2011 Nelson .............. B01D 46/4227 55/357
8,157,880 B2 * 4/2012 Muenkel ........... B01D 46/0021 55/385.3
8,652,327 B2 * 2/2014 Lucas ................. B01D 29/21 210/256
8,790,431 B2 * 7/2014 Muenkel ........... B01D 46/0021 55/337
9,132,371 B2 9/2015 Heim et al.
D749,641 S * 2/2016 Menssen ......................... D15/5
D785,676 S * 5/2017 Menssen ......................... D15/5
9,707,503 B2 * 7/2017 Gieseke ............ B01D 46/0001
2003/0182911 A1 * 10/2003 Schrage ............ B01D 46/0001 55/498
2004/0216434 A1 * 11/2004 Gunderson ........... B01D 29/21 55/498
2005/0247034 A1 * 11/2005 Canova ............... F02M 35/024 55/385.3
2007/0006560 A1 * 1/2007 Ruhland ............... B01D 46/10 55/497
2007/0039296 A1 * 2/2007 Schrage .............. B01D 25/001 55/497
2007/0289265 A1 * 12/2007 Coulonvaux ...... B01D 46/0023 55/324
2008/0041026 A1 * 2/2008 Engel ................ B01D 46/2411 55/432
2009/0038276 A1 * 2/2009 Gunderson ........ B01D 46/0021 55/343
2010/0037570 A1 * 2/2010 Osendorf .......... B01D 46/0004 55/355
2010/0162673 A1 * 7/2010 Grosche ............ B01D 46/0004 55/482
2010/0186353 A1 * 7/2010 Ackermann ....... B01D 46/0021 55/321
2010/0242423 A1 * 9/2010 Morgan ............ B01D 46/0005 55/483
2011/0000458 A1 * 1/2011 Muenkel ........... B01D 46/0021 123/198 E
2012/0198802 A1 * 8/2012 Menssen ............... B01D 45/16 55/337
2013/0031878 A1 * 2/2013 Menssen ............... B01D 45/16 55/345
2014/0033666 A1 * 2/2014 Menssen ........... B01D 46/2418 55/495
2014/0047808 A1 * 2/2014 Menssen ........... B01D 46/2411 55/502
2014/0165513 A1 * 6/2014 Oelpke ............. F02M 35/0216 55/385.1
2014/0208702 A1 * 7/2014 Lundgren .......... B01D 46/2414 55/357
2014/0237966 A1 * 8/2014 Chin ................. B01D 46/0005 55/483
2014/0373495 A1 * 12/2014 Madeira ............ F02M 35/0204 55/502
2015/0068169 A1 * 3/2015 Schulz .................. B01D 45/16 55/337
2016/0023137 A1 * 1/2016 Sorger .............. B01D 46/4236 210/435
2016/0101380 A1 * 4/2016 Pereira Madeira ......................... B01D 46/0041 55/503
2016/0115917 A1 * 4/2016 Sorger .............. B01D 46/0005 55/481
2016/0129385 A1 * 5/2016 Schulz ................ B01D 46/521 55/482
2016/0131094 A1 * 5/2016 Pereira Madeira ......................... F02M 35/02425 96/414
2016/0296867 A1 * 10/2016 Stark ................ F02M 35/02416
2016/0296868 A1 * 10/2016 Stark ................. B01D 46/0005
2016/0296869 A1 * 10/2016 Stark ................. F02M 35/0202
2016/0296872 A1 * 10/2016 Stark ................. B01D 46/0046
2017/0096973 A1 * 4/2017 Kaufmann .......... F02M 35/024
2017/0122270 A1 * 5/2017 Williams .......... B01D 46/0004
2017/0218802 A1 * 8/2017 Takano ................. F01M 11/03
2017/0254301 A1 * 9/2017 Marcondes ........ B01D 46/0005
2017/0296958 A1 * 10/2017 Nam .................... A47L 9/1608
2018/0008923 A1 * 1/2018 Burton .................. B01D 45/14
2018/0050296 A1 * 2/2018 Fritzsching ........ B01D 46/2414

FOREIGN PATENT DOCUMENTS

DE 102008062955 U1 7/2010
DE 102010014277 U1 5/2011
DE 102014006850 A1 12/2014
DE 202013011865 U1 12/2014

* cited by examiner

FILTER HOLDER, FILTER ELEMENT AND FILTER ARRANGEMENT

TECHNICAL FIELD

The present invention relates to a filter holder, a filter element and a filter arrangement.

BACKGROUND OF THE INVENTION

Known air filters for vehicles can be formed from a filter medium wound onto a central tube.

WO 2009/106591 A2 describes an air filter including a pre-separator. Particles contained in the unfiltered gas can be separated by means of centrifugal force with the aid of the pre-separator. An increase of the filter efficiency can be achieved as a result, since the particles are separated from the unfiltered gas before reaching the air filter. The air filter has an oval cross section perpendicular to the longitudinal direction of the filter. The air filter is received in a filter receptacle.

SUMMARY OF THE INVENTION

Against this background, the object of the present invention is to specify an improved filter receptacle for a filter element.

Accordingly, what is proposed is a filter receptacle for a filter element that, transversely to a longitudinal direction thereof, has an oval cross section. The filter receptacle includes a receiving portion for receiving the filter element, a fluid inlet for allowing fluid to be filtered into the filter receptacle, and a fluid outlet for discharging the fluid filtered with the aid of the filter element from the filter receptacle, wherein the fluid outlet is arranged such that a direction of flow of the filtered fluid out from the fluid outlet is oriented parallel to the longitudinal direction of the filter element, and wherein the fluid outlet has a circular cross section facing away from the filter element and an oval cross section facing toward the filter element.

The filter receptacle may also be referred to as a housing or filter housing. With the aid of the above arrangement, a pressure loss when the filtered fluid flows out is reduced. This increases the efficiency of a filter arrangement having a filter receptacle of this type. The oval cross section preferably has a shorter height than the diameter of the circular cross section.

In some embodiments the circular cross section and the oval cross section of the fluid outlets have the same cross-sectional area. The filtered fluid can thus flow off in an unhindered manner. The oval cross section may also have a larger cross-sectional area than the circular cross section.

In further embodiments the fluid outlet has a curved transition portion, which connects the circular cross section of the fluid outlet to the oval cross section of the fluid outlet. The transition cross section is preferably curved in an S-shaped manner.

In further embodiments the fluid inlet widens in a width direction of the filter element from the circular cross section to the oval cross section. A width of the oval cross section is preferably larger than a diameter of the circular cross section.

In further embodiments the fluid inlet becomes narrower in a height direction of the filter element from the circular cross section to the oval cross section. A height of the oval cross section is preferably smaller than a diameter of the circular cross section.

In further embodiments the filter receptacle has a tubular incident-flow protection, in which the filter element can be received at least in part. The incident-flow protection or the incident-flow shroud is preferably fluid-impervious.

In further embodiments the incident-flow protection is formed in one piece with a maintenance cover removable from the filter receptacle. The maintenance cover is preferably an economical plastics injection-molded component. Alternatively, the maintenance cover may be fabricated for example from sheet metal, in particular from sheet steel.

A filter element that has an oval cross section transversely to a longitudinal direction of the filter element is also proposed. The filter element includes a first end plate, a second end plate, and a filter body arranged between the first end plate and the second end plate, wherein a cross section of the filter body at the second end plate is greater than a cross section of the filter medium at the first end plate. The filter element may have one or more of the features described below or in the claims.

The filter body preferably tapers conically on the inner side. In comparison to a non-conically tapering filter body, an enlarged fluid exit opening of the filter element is made possible. The transition portion of the fluid outlet can thus be optimized, since the height of the oval cross section of the fluid outlet can be approximated to the diameter of the circular cross section of the fluid outlet. This leads to a further reduced pressure loss. The filter element is preferably an air filter for filtering intake air for an internal combustion engine. The filter element is preferably used in motor vehicles, trucks, construction vehicles, watercraft, rail vehicles, agricultural machinery and vehicles, or aircraft.

In some embodiments the cross section of the filter body increases from the first end plate in the direction of the second end plate continuously. The filter element may surround a secondary element, which can be received in the filter receptacle. The secondary element may have a conical or truncated cone-shaped geometry, corresponding to the filter body of the first filter element.

A filter arrangement having a filter receptacle of this type and having a filter element and/or secondary element of this type, which is received in a receiving portion of the filter receptacle, is also proposed.

A filter receptacle for a filter element that, transversely to a longitudinal direction thereof, has an oval cross section is also proposed. The filter receptacle includes a receiving portion for receiving the filter element, a fluid inlet for allowing fluid to be filtered into the filter receptacle, and a fluid outlet for discharging the fluid filtered with the aid of the filter element from the filter receptacle, wherein the fluid inlet is arranged such that an inflow direction of the fluid to be filtered is oriented in the direction of a lateral surface of the filter element receivable in the receiving portion, such that the fluid to be filtered flows tangentially around the filter element receivable in the receiving portion in order to deposit particles contained in the fluid to be filtered on a wall of the receiving portion with the aid of centrifugal force. The filter receptacle may also be referred to as a housing or filter housing.

Since the inflow direction is oriented in the direction of the filter element, the filter element is subject to a direct incident flow compared with known arrangements. Since the filter receptacle itself acts as a pre-separator, in particular as a centrifugal separator, it is possible to dispense with additional pre-separators, which are arranged upstream of the filter element. This results in a cost advantage compared with known arrangements. The cross-sectional geometry of the receiving portion, which in particular is oval, leads to a favorable degree of pre-separation of the particles compared with a circular cross-sectional geometry. Furthermore, on account of the oval cross-sectional geometry, with identical installation volume even narrow or rectangular installation spaces can be used to receive the filter receptacle. In particular, the filter receptacle is arranged such that a width direction of the receiving portion is positioned horizontally. The inflow direction of the fluid to be filtered is preferably oriented such that the fluid directly contacts a curvature of the wall of the receiving portion. The fluid is thus heavily accelerated. This leads to a favorable degree of pre-separation compared with a receiving portion of circular cross section. In the present case, the term oval can be understood to mean a rectangular geometry with rounded corners, an at least approximately elliptical geometry, or a geometry formed from a plurality of curve portions or circular portions. In the present case, both for filter receptacles and the filter elements to be received and/or sealing means thereof, an oval form preferably has two axes of symmetry, which in particular intersect one another orthogonally at a center point, through which a central axis of filter receptacle and/or filter element(s) extends perpendicularly to the two axes of symmetry. Elliptical shapes can also be produced by approximation constructions of ellipses, for example via osculating circles or in accordance with de la Hire. The receiving portion preferably has a first and a second housing part, which can be interconnected with the aid of fastening means. The housing parts can be fabricated from a plastics material. The housing parts are preferably plastics injection-molded components. The housing parts may alternatively also be manufactured from sheet metal. The receiving portion may also be formed in one part. This means that the housing parts can be interconnected in one piece. The particles may be sand, dust, plant parts, or the like, for example.

In some embodiments the inflow direction of the fluid to be filtered is oriented perpendicularly to the longitudinal direction of the filter element receivable in the receiving portion. The fluid to be filtered thus flows partially into the gap between receiving portion and filter element and optionally at least in part also directly onto the filter element and flows around this, preferably in a coiled manner.

In further embodiments the receiving portion is designed to receive the filter element centrally in the receiving portion with respect to a longitudinal direction of the filter element. A second end plate of the filter element may have bracing elements, with the aid of which the filter element can be positioned optimally in the receiving portion. The elastically deformable bracing elements also serve for vibration damping and/or tolerance compensation.

In further embodiments the receiving portion is arranged to receive the filter element such that a uniform distance is provided between the filter element and the wall of the receiving portion, around the filter element, perpendicular to the longitudinal direction. The distance may vary in the longitudinal direction. By way of example, the distance may become smaller or larger in the longitudinal direction. The filter element may taper conically in the longitudinal direction.

In further embodiments the receiving portion is arranged to receive the filter element such that a uniform distance is provided between the filter element and the wall of the receiving portion perpendicularly to the outer lateral surface of the filter element and/or perpendicularly to the inner wall of the receiving portion. The distance is preferably substantially or completely constant over the longitudinal direction, but may also vary in the longitudinal direction. By way of example, the distance may become smaller or larger in the longitudinal direction. The filter element may for this purpose taper conically in the longitudinal direction in or against the outflow direction.

In further embodiments the receiving portion has a width direction and a height direction in cross section, which preferably coincide with axes of symmetry of the oval shape, wherein the fluid inlet is classified such that the inflow direction of the fluid is perpendicular to the width direction. The fluid inlet is preferably arranged laterally on the receiving portion, such that the incoming fluid contacts the wall of the receiving portion. Here, in further embodiments, an extension of the receiving portion in the width direction is greater than in the height direction. By way of example, the receiving portion is at least 1.5 times and preferably two to three times wider than tall. Here, the width-to-height ratio of the filter element intended to be received in the receiving portion is preferably greater than the width-to-height ratio of the receiving portion. A suitable filter element more preferably has a similar height-to-width ratio and in particular is of such a shape that a uniform distance is provided between the filter element and the wall of the receiving portion, around the filter element perpendicularly to the outer lateral surface of the filter element and/or perpendicularly to the inner wall of the receiving portion.

In further embodiments the fluid inlet has an oval cross section with a larger diameter parallel to the longitudinal axis of the filter receptacle than perpendicularly to the longitudinal axis. A low pressure loss when the fluid to be filtered flows into the fluid inlet can thus be achieved. Alternatively, the fluid inlet may have a circular cross section.

In further embodiments the filter receptacle includes a removable maintenance cover, which has a particle discharge opening. The maintenance cover is preferably a plastics injection-molded component. The maintenance cover may also be fabricated from a sheet metal. The maintenance cover may be secured to the receiving portion by means of quick-action closures. The particle discharge opening may have a valve.

In further embodiments the maintenance cover has a tubular, in particular oval-tubular incident-flow protection, which in particular protrudes into the interior of the filter receptacle and can receive the filter element at least in part and preferably coaxially. The incident-flow protection is preferably formed in a materially bonded manner with the maintenance cover. The length of the incident-flow protection is preferably such that it surrounds the filter element over approximately 15-50%, preferably 20-40%, of the overall length thereof in the longitudinal direction starting from the closed end plate, i.e. the length of the incident-flow protection in the longitudinal direction is approximately 15-50%, preferably 20-40% of the length of the filter element.

Furthermore, a filter element that, transversely to a longitudinal direction thereof, has an oval cross section is proposed. The filter element includes a first end plate, a second end plate, and a filter body arranged between the first end plate and the second end plate, wherein the filter element may have an incident-flow protection, which covers the filter body at least in part. The filter element may have features mentioned above as well as features mentioned below or in the claims.

The incident-flow protection may also be provided on the receiving portion. With the aid of the incident-flow protection, particles contained in the fluid to be filtered, for example sand, are prevented from directly contacting the filter medium. Damage to the filter medium is thus prevented. This increases the service life of the filter element. The filter element is preferably an air filter for filtering intake air for an internal combustion engine. The filter element is preferably used in motor vehicles, trucks, construction vehicles, watercraft, rail vehicles, agricultural machinery and vehicles, or aircraft. The filter medium is preferably folded in a zigzag pattern. The filter medium is for example a filter paper, a filter fabric, a filter non-woven fabric, or a filter fleece. In particular, the filter medium can be produced in a spun-bonded fabric or meltblown method. The filter medium may also be matted or needled. The filter medium may contain natural fibers, such as cellulose or cotton, or synthetic fibers, for example made of polyester, polyvinyl sulfite or polytetrafluoroethylene. The fibers, during processing, may be oriented in, at an incline to and/or transversely to the machine direction or may be oriented in an unordered manner. The filter medium can be fused, bonded, or welded to the end plates.

In some embodiments the incident-flow protection is bonded, welded or fused to the filter body formed from the filter medium. Alternatively, the incident-flow protection lies flush and preferably loosely on the filter medium, in particular the fold edges of the filter medium. The incident-flow protection is in particular arranged adjacently to a first end plate of the filter element. The incident-flow protection can be connected to the first end plate, for example surrounded by the material thereof in an interlocking manner in part.

In further embodiments the incident-flow protection is fluid-impervious. The incident-flow protection may be a film. Alternatively, the incident-flow protection may be fluid-permeable. By way of example, the incident-flow protection may be fabricated from a fine-meshed net or lattice. The incident-flow protection is preferably fabricated from a plastics material.

In further embodiments the filter element surrounds a secondary element, which likewise can be received in the filter receptacle. The filter element may also be referred to as a first filter element, and the secondary element may also be referred to as a second filter element. The first end plate of the filter element preferably has a receiving opening, into which the secondary element can be inserted. This receiving opening at the same time preferably constitutes the outflow cross section of the first filter element.

In further embodiments the filter element has a sealing arrangement provided on the preferably open first end plate, wherein the sealing arrangement is designed to seal off the filter element with respect to a filter receptacle, in particular radially or axially, in such a way that the onflow side or dirty side of the filter element is separated from the outflow side or clean side. The sealing arrangement is preferably formed materially integrally with the first end plate. In particular, the first end plate and the sealing arrangement can be fabricated from a polyurethane material, which in particular is cast, in particular from a foamed polyurethane material. The sealing arrangement is preferably spring-elastically deformable. The sealing arrangement is preferably designed to seal off the filter element with respect to the filter receptacle radially inwardly, i.e. in the direction of a fluid outlet of the filter receptacle, and for this purpose preferably has an inwardly directed, annularly closed, in particular oval sealing surface. The sealing arrangement may also be designed to seal off the filter element axially with respect to the filter receptacle.

A filter arrangement including a filter receptacle of this type and a filter element of this type received in a receiving portion of the filter receptacle is also proposed, wherein a fluid inlet of the filter receptacle is arranged such that an inflow direction of the fluid to be filtered is oriented in the direction of a lateral surface of the filter element received in the receiving portion, such that the fluid to be filtered flows tangentially and/or in a coiled manner, in particular in an oval-coiled manner, around the filter element received in the receiving portion in order to deposit particles contained in the fluid to be filtered on a wall of the receiving portion with the aid of centrifugal force.

The inflow direction of the fluid to be filtered is preferably oriented such that the fluid directly contacts a curvature of the wall at the receiving portion. The fluid is thus heavily accelerated, whereby the centrifugal forces acting on the fluid are increased. This promotes the degree of pre-separation of the particles. The filter arrangement may also be referred to as a two-stage filter, wherein the first stage is formed by the centrifugal force separation and the second stage is formed by a filter element.

A filter element that, in the longitudinal direction thereof, has an oval cross section is also proposed. The filter element includes a peripheral sealing arrangement in order to seal off, in particular radially, the filter element with respect to a filter receptacle for the element, wherein the sealing arrangement has two first curvature portions arranged opposite one another and two second curvature portions arranged opposite one another, wherein the first curvature portions each have a first radius of curvature and the second curvature portions each have a second radius of curvature, and wherein the first radius of curvature differs from the second radius of curvature. A construction of the seal exclusively with two different radii, which are each completely or at least substantially constant over the individual curvature portions, may have advantages in respect of the tool manufacture and the quality control.

The second radius of curvature may approach infinity, i.e. may also be straight, and this is also true analogously for an oval shape of the filter element. In one embodiment the sealing arrangement has a substantially arena-like geometry. It has proven to be advantageous if the sealing arrangement does not have any straight portions, but only curved portions. This is beneficial in particular when the filter element or the filter body formed from a filter medium has an oval cross section, of which the outer contour has partially straight or weakly curved portions. Since the sealing arrangement has substantially exclusively curved portions, a constant contact pressure of the sealing arrangement against any engagement region of the filter receptacle can be achieved over the entire periphery of the sealing arrangement. The sealing arrangement is preferably designed to seal off the filter element with respect to the filter receptacle radially inwardly. More severe curvatures or smaller radii at the sealing arrangement are more advantageous than weaker curvatures or larger radii in the case of radial sealing inwardly or outwardly, since with increasing curvature the risk reduces of the sealing arrangement losing contact with a seal bearing surface on the filter receptacle side in the event of vibratory load. The sealing arrangement may alternatively or additionally also be designed to axially seal off the filter element with respect to the filter receptacle. In the present case, “inwardly” is understood to mean a direction oriented radially toward the fluid outlet of the filter receptacle. The sealing arrangement is preferably spring-elastically deformable. The filter element may surround a secondary element. The sealing arrangement preferably runs completely around a first end plate of the filter element. The filter element is preferably an air filter for filtering intake air for an internal combustion engine. The filter element is preferably used in motor vehicles, trucks, construction vehicles, watercraft, rail vehicles, agricultural machinery and vehicles, or aircraft.

In accordance with the concept of the invention it is advantageous, but not absolutely necessary, to choose a course of the sealing arrangement which is formed in particular exclusively from circle segments. A key advantage specifically is that the sealing arrangement only has curved portions, in particular curved continuously in a direction, and therefore a continuously convex external contour without straight or concave portions is produced. The invention therefore also relates somewhat more generally to a filter element having an oval cross section, defined by a filter body made of a filter medium, with two first mutually opposed curvature portions of stronger curvature, which are interconnected by two second mutually opposed curvature portions of weaker curvature compared with the first curvature portions, the filter element further including a sealing arrangement that runs around in an oval manner in order to seal off, in particular radially, the filter element with respect to a filter receptacle, wherein the sealing arrangement has two first mutually opposed curvature portions of stronger curvature and two second mutually opposed curvature portions of weaker curvature compared with the first curvature portions, wherein the second curvature portions of the sealing arrangement are curved more heavily than the second curvature portions of the oval cross section defined by the filter body. The first curvature portions are preferably interconnected by the second curvature portions in such a way that first and second curvature portions transition into one another in each case, in particular transition directly into one another, preferably transition into one another continuously and more preferably smoothly. This for example means that no further curvature portion with a curvature greater than the curvature of the two first curvature portions can be provided in the transition region between first and second curvature portions. This has the advantage that, in spite of the non-circular shape, a peripherally good sealing effect can be ensured.

An oval cross section or course that has a center point and two axes of symmetry intersecting one another at said center point and/or a width-to-height ratio of more than 1.5:1, preferably more than 2:1, more preferably less than 5:1 or 4:1, particularly preferably less than 3:1, is preferably selected for the sealing arrangement and/or the filter body and/or at least one of the end plates. Width-to-height ratios of the filter element and/or filter body in the range between 1.5:1 and 3:1 are particularly advantageous for a pre-separation effect by centrifugal force. The filter body and sealing arrangement particularly preferably have the same axes of symmetry. The filter element particularly preferably has a longitudinal axis of symmetry, with respect to which the sealing arrangement and/or the filter body and/or at least one end plate is/are substantially symmetrical. This longitudinal axis of symmetry preferably extends through the point of intersection of the above-mentioned, intersecting axes of symmetry, preferably perpendicularly thereto in each case. The longitudinal axis of symmetry is preferably coaxial with the central axis of the filter receptacle and/or filter element or can be defined thereby.

In all embodiments the second curvature portions of the sealing arrangement and the second curvature portions of the oval cross section defined by the filter body are particularly preferably arranged adjacently to one another, i.e. have substantially the same angular position with respect to the oval shape. The same is true for the first curvature portions of the sealing arrangement, which are curved more heavily than the second curvature portions, and the cross section defined by the filter body.

In some embodiments curvature center points of the first radii of curvature are arranged on a first straight line, wherein curvature center points of the second radii of curvature are arranged on a second straight line, and wherein the first straight line is positioned perpendicularly to the second straight line. The second radii of curvature are preferably greater than the first radii of curvature. The first radii of curvature are preferably of identical size. The second radii of curvature are preferably of identical size.

In further embodiments the second straight line is arranged centrally between the curvature center points of the first radii of curvature and/or the first straight line is arranged centrally between the curvature center points of the second radii of curvature. End points of the straight lines are defined in each case by the curvature center points. The first straight line preferably divides the second straight line centrally, and vice versa.

A filter element according to the invention preferably has a filter body formed from a filter medium. A fluid can preferably flow radially through the filter body from the outside in, or vice versa. The filter body may preferably be formed by an annularly closed filter medium folded in a zigzag pattern and may have a circular, oval or elliptical shape. The filter body may also be formed from a tubular, in particular multi-layered winding of a filter medium. Alternatively, the filter body may be formed as a filter body through which a fluid can flow axially, for example by an in particular oval winding formed from a semi-finished product having two filter media layers, an undulating layer and a smooth layer, which form reciprocally closed channels.

In further embodiments the filter element has at least one end plate and a filter body connected to the end plate, wherein the sealing arrangement is provided on a front side, facing away from the filter body, of the end plate, which in particular is open. The end plate is preferably a first end plate of the filter element. The filter element preferably has two end plates, between which the filter body is arranged. The sealing arrangement may be formed materially integrally with the first end plate. The second end plate may preferably be closed.

In further embodiments an outer contour and/or inner contour of the sealing arrangement is not arranged parallel to an outer contour and/or inner contour of the end plate. The outer or inner contour of the sealing arrangement preferably does not follow the outer or inner contour of the end plate, i.e. the distance of the outer contour of the sealing arrangement from the outer contour of the end plate is not constant. The sealing surface, i.e. the bearing surface of the sealing arrangement for bearing in a sealing manner against a corresponding seal bearing surface of the housing, more preferably does not follow the outer contour of the end plate. In the case of a radial seal, this generally relates to the radial inner surface of the sealing arrangement, however the radial outer surface of the sealing arrangement may also form the sealing surface. The sealing arrangement, in particular the inner surface of the seal, in the middle of the slightly curved curvature portions of the filter body and/or the sealing arrangement, particularly preferably has a shorter distance from the outer (in particular radially outer) lateral surface of the filter body and/or the outer contour of an open end plate than in the transition region between heavily and slightly curved curvature portions of the filter body and/or the sealing arrangement. The curvature of the seal in the weakly curved region of the filter body may thus be reinforced and therefore optimized in respect of the reliability of the seal under vibratory load. This preferably results, geometrically, in the fact that the curvature of the second curvature portions of the seal also cannot be constructed by a full-scale enlargement/reduction (central stretching) of the outer contour of the open end plate and/or of the filter body. Rather, this means preferably that the curvature of the second curvature portions of the seal is stronger than the curvature of a comparable comparison curve, which is in particular parallel to the outer contour of filter body and/or open end plate, is in particular concentric and is in particular obtained from the outer contour by full-scale reduction or extending, or which extends within the outer contour and parallel thereto, said comparison curve having, in the middle of the second curvature portions of the seal, outer contour of the end plate and/or outer contour of the filter body, at least substantially the same distance to the outer contour of the end plate and/or filter body.

In an advantageous embodiment the sealing arrangement is arranged within a virtual axial extension of the outer lateral surface of the filter body and/or the outer contour of an open end plate in the longitudinal direction. This has the advantage that the sealing arrangement does not require any additional installation space radially to the longitudinal direction and can be formed directly, for example integrally with the end plate or with a consistent material. If an annularly closed filter bellows folded in a zigzag or star pattern and made of a filter medium is used as filter body, it may be particularly advantageous for the sealing arrangement to be arranged within a cross section of the filter body (more precisely within a virtual axial extension of the cross section in longitudinal direction). This has the advantage that the cross section of the outflow path from the filter element is not unnecessarily reduced by the sealing arrangement, which would increase the flow resistance.

In further embodiments the filter element has an incident-flow protection encasing the filter body at least in portions. With the aid of the incident-flow protection, particles contained in the fluid to be filtered, such as small stones, are prevented from directly contacting the filter medium. Damage to the filter medium is thus prevented. This increases the service life of the filter element.

In further embodiments the incident-flow protection is adhesively bonded, welded or fused to the filter body. The incident-flow protection alternatively lies flush and preferably loosely on the filter medium, in particular the fold edges of the filter medium. In particular, the incident-flow protection is arranged adjacently to a first end plate of the filter element. The incident-flow protection can be connected to the first end plate, for example surrounded by the material thereof in an interlocking manner in part. The incident-flow protection can thus be fixedly connected to the filter body by means of the end plate material, in particular polyurethane or polyurethane foam.

In further embodiments the incident-flow protection is fluid-impervious. The incident-flow protection may be a film. Alternatively, the incident-flow protection may be fluid-permeable. By way of example, the incident-flow protection may be fabricated from a fine-meshed net or lattice. The incident-flow protection is preferably fabricated from a plastics material. The incident-flow protection preferably extends completely once, in particular in an annularly closed manner, around the filter body. It can thus be ensured that a filter element that can be installed in two positions on account of the symmetry is protected in both positions against a frontal incident flow through a fluid inlet and/or that, in both possible installation positions, the formation of a dirty fluid flow important for the pre-separation and rotating around the filter element can be provided in a similar manner. Here, the incident-flow protection should extend, preferably over the entire periphery, but at least in the regions that may be exposed to a direct incident flow, axially from the first end plate so far beyond the filter body that the axial extension of the fluid inlet of a filter housing is covered. This is the case, depending on the design of the filter system, when the incident-flow protection extends over at least 15, 20 or 25% of the axial length of the filter body and/or at most 80, 70, 60, 50, 40 or 30% of the axial length of the filter body.

A filter arrangement having a filter receptacle of this type and a filter element of this type is also proposed, which filter element is received in a receiving portion of the filter receptacle.

In some embodiments the receiving portion has an engagement region, with which a peripheral sealing arrangement of the filter element engages, wherein a sealing arrangements bears via an interface against the engagement region. The engagement region is preferably provided peripherally around a fluid outlet of the filter receptacle. The sealing arrangement preferably bears on an inner side against the engagement region.

A filter receptacle for a filter element that, transversely to a longitudinal direction thereof, has an oval cross section is also proposed. The filter receptacle includes a receiving portion for receiving the filter element, a fluid inlet for allowing fluid to be filtered into the filter receptacle, and a fluid outlet for discharging the fluid filtered with the aid of the filter element from the filter receptacle, wherein the fluid inlet is arranged such that a direction of flow of the fluid to be filtered into the fluid inlet is oriented parallel to the longitudinal direction of the filter element, wherein the fluid inlet has a guide element, which is designed to divert the fluid to be filtered as it flows into the fluid inlet, in such a way that said fluid flows spirally around the filter element receivable in the receiving portion in order to deposit particles contained in the fluid to be filtered on a wall of the receiving portion with the aid of centrifugal force. The filter receptacle can also be referred to as a housing or filter housing.

The guide element may be a guide vane. Since the fluid to be filtered flows around the filter element spirally, in a coiled manner or helically, the filter receptacle acts as a pre-separator for separating the particles. Is thus possible to dispense with additional pre-separators. The filter receptacle can thus be produced particularly economically. The filter receptacle preferably has an oval cross section. The preferably oval cross-sectional geometry of the receiving portion leads to a favorable degree of pre-separation of the particles in comparison to a circular cross-sectional geometry. Furthermore, on account of the oval cross-sectional geometry, even narrow or rectangular installation spaces can be used to receive the filter receptacle. In particular, the filter receptacle is arranged such that a width direction of the receiving portion is positioned horizontally. The receiving portion preferably has a first and a second housing part, which can be interconnected with the aid of fastening means. The housing parts can be produced from a plastics material or a metal material. The housing parts are preferably plastics injection-molded components. The receiving portion may also be formed in one part. This means that the housing parts form a component. The maintenance cover is preferably removable from the receiving portion.

In some embodiments the filter receptacle has a multiplicity of fluid inlets. Each fluid inlet has at least one guide element. The guide elements are preferably formed as guide vanes.

In further embodiments the fluid inlets are distributed uniformly over a periphery of the filter receptacle. The fluid inlets are preferably distanced uniformly from one another. Alternatively, the fluid inlets can be distributed non-uniformly.

In further embodiments a respective angle of curvature of the guide elements changes over a periphery of the filter receptacle. Each guide element preferably has a first portion oriented parallel to the inflow direction and a second portion oriented in a sloping manner relative to the inflow direction. The portions are inclined relative to one another in the angle of curvature. The angles of curvature of all guide elements may be the same. Alternatively, the guide elements may have different angles of curvature. By way of example, the angles of curvature may vary over the periphery of the filter receptacle.

In further embodiments a respective inflow cross section of the fluid inlets changes over a periphery of the filter receptacle. The inflow cross section may be rectangular or round, for example. The degree of pre-separation can be optimized by the variation of the inflow cross sections.

In further embodiments the fluid inlet is arranged on a maintenance cover removable from the filter receptacle. The fluid inlet is preferably an opening in the maintenance cover. The maintenance cover preferably also includes the guide elements. The guide elements are in particular formed materially integrally with the maintenance cover. The maintenance cover can be secured to the filter receptacle with the aid of quick-action closures.

In further embodiments the guide element is positioned in such a way that it is arranged beside the filter element in the longitudinal direction thereof. A multiplicity of guide elements are preferably arranged around the filter element. The installation space available for the filter receptacle can be utilized optimally by the filter element. The length of the filter element may thus correspond approximately to the length of the filter receptacle.

In further embodiments the filter receptacle has a tubular incident-flow protection, in which the filter element can be arranged at least in part. The incident-flow protection or the incident-flow shroud is preferably fluid-impervious.

In further embodiments the incident-flow protection is formed materially integrally with a maintenance cover of the filter receptacle and/or the filter receptacle itself. The maintenance cover is preferably an economical plastics injection-molded component. The maintenance cover may also be fabricated from sheet metal.

A filter arrangement including a filter receptacle of this type and a filter element, which is received in a receiving portion of the filter receptacle, is also proposed.

Further possible implementations of the invention also include combinations not explicitly specified of features or method steps described previously or hereinafter in respect of the exemplary embodiments. Here, a person skilled in the art will also add individual aspects as improvements or supplementations to the respective basic form of the invention.

Further embodiments of the invention are specified in the depending claims and in the exemplary embodiments of the invention described hereinafter. The invention will be explained hereinafter in greater detail on the basis of exemplary embodiments with reference to the accompanying figures.

BRIEF DESCRIPTION OF THE DRAWINGS

In the drawings.

In the figures, like or functionally like elements have been provided with the same reference signs, unless stated otherwise.

EMBODIMENT(S) OF THE INVENTION

Figure 1:
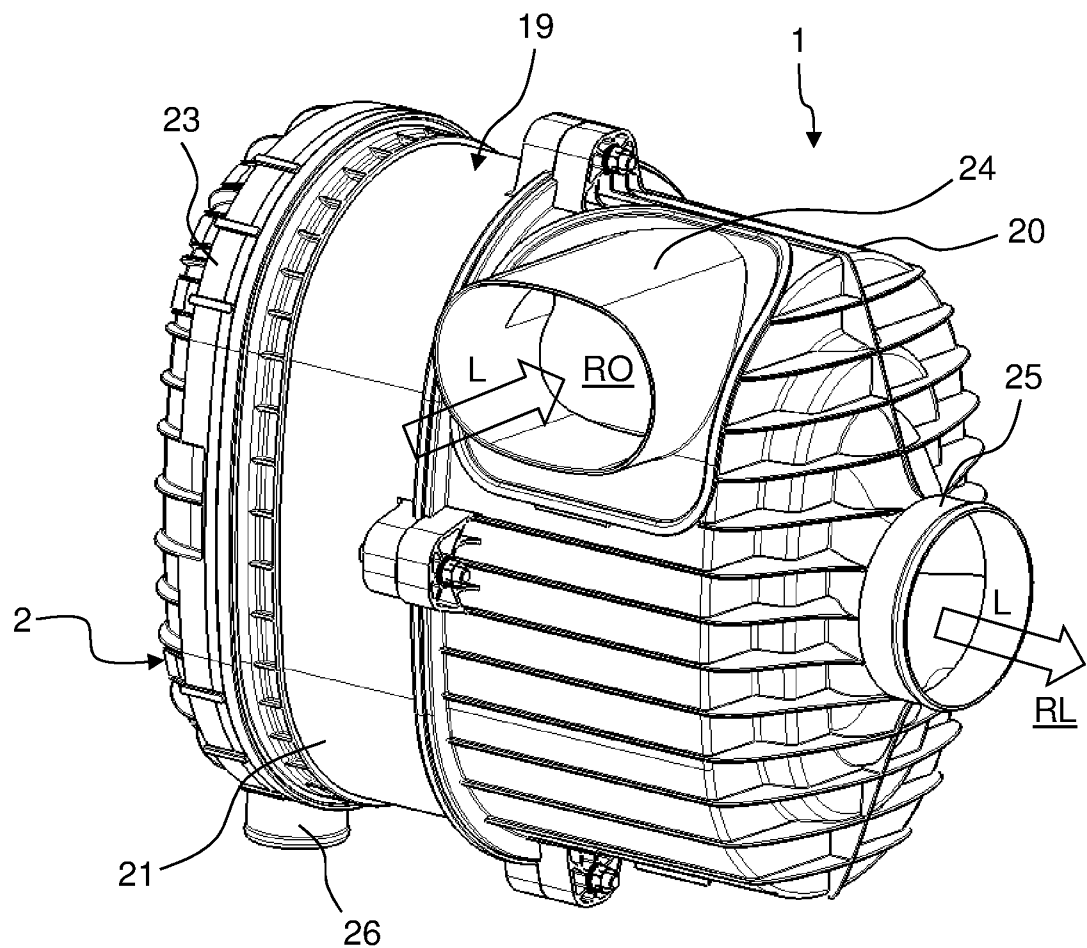
FIG. 1: shows a schematic perspective view of an embodiment of a filter arrangement.
Figure 2:
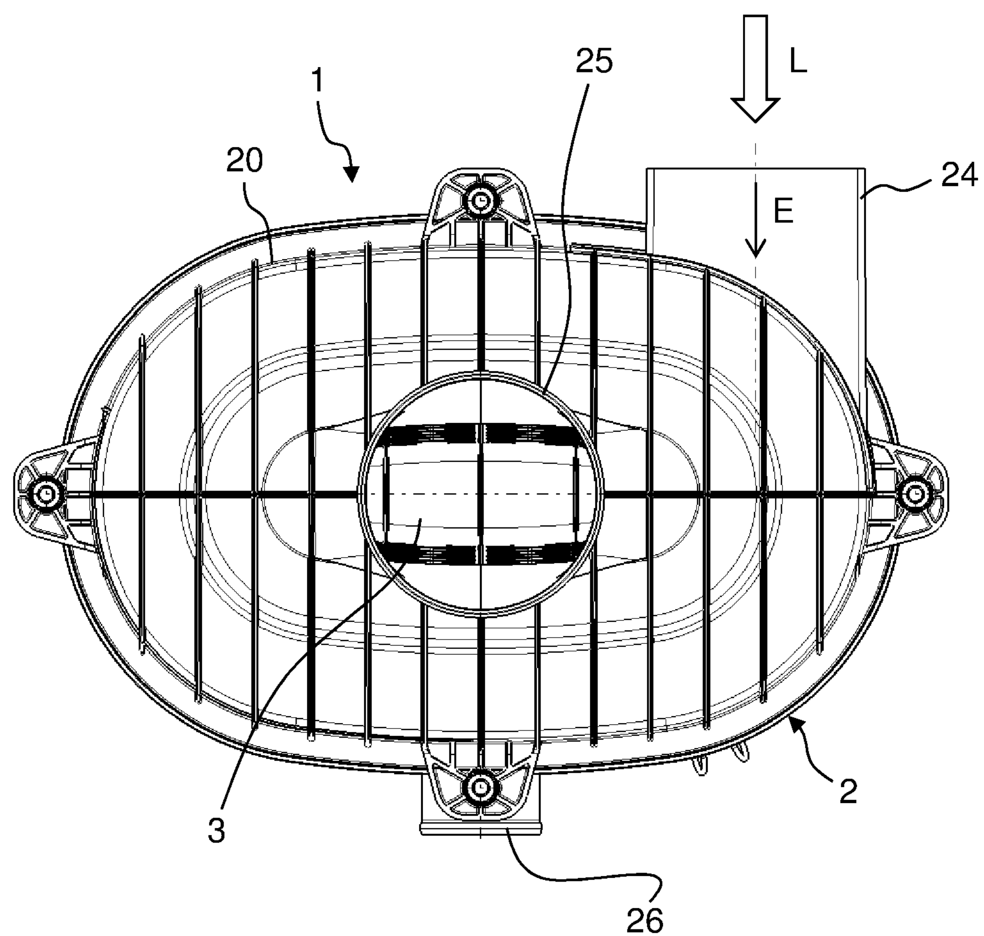
FIG. 2: shows a schematic view of the filter arrangement according to FIG. 1.
Figure 3:
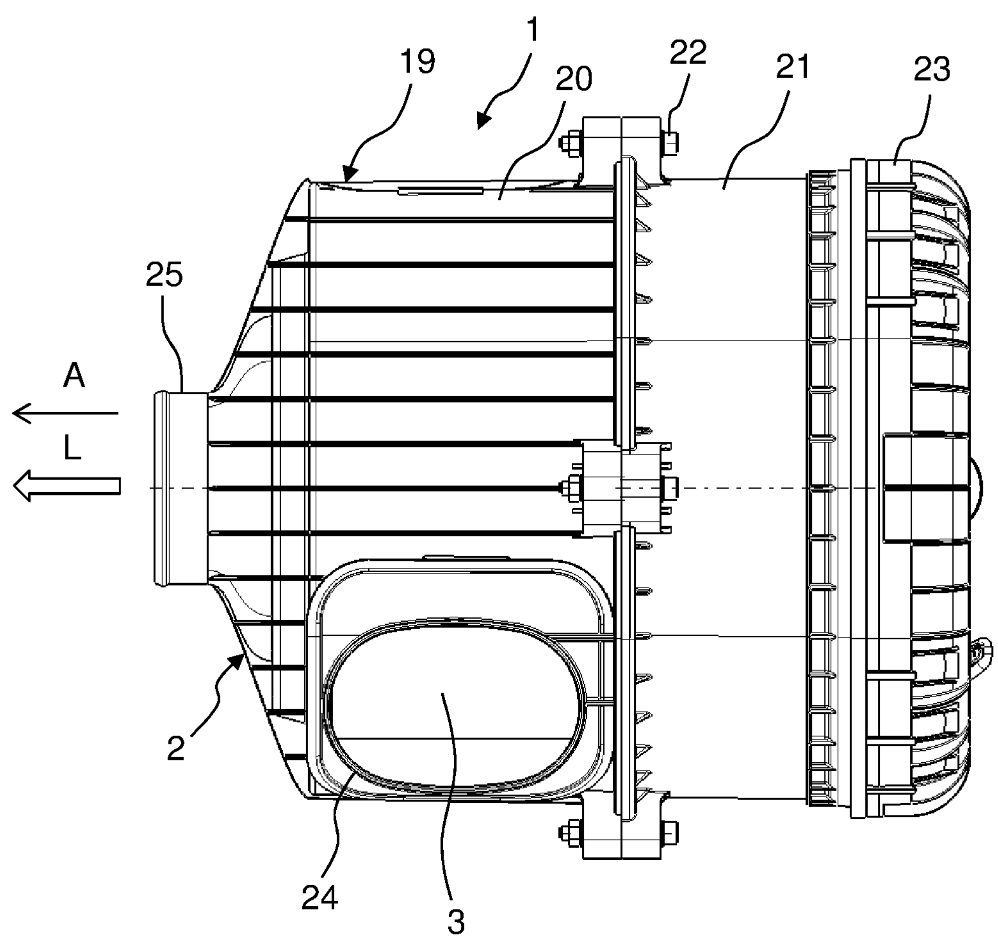
FIG. 3: shows a schematic view of the filter arrangement according to FIG. 1.
Figure 4:
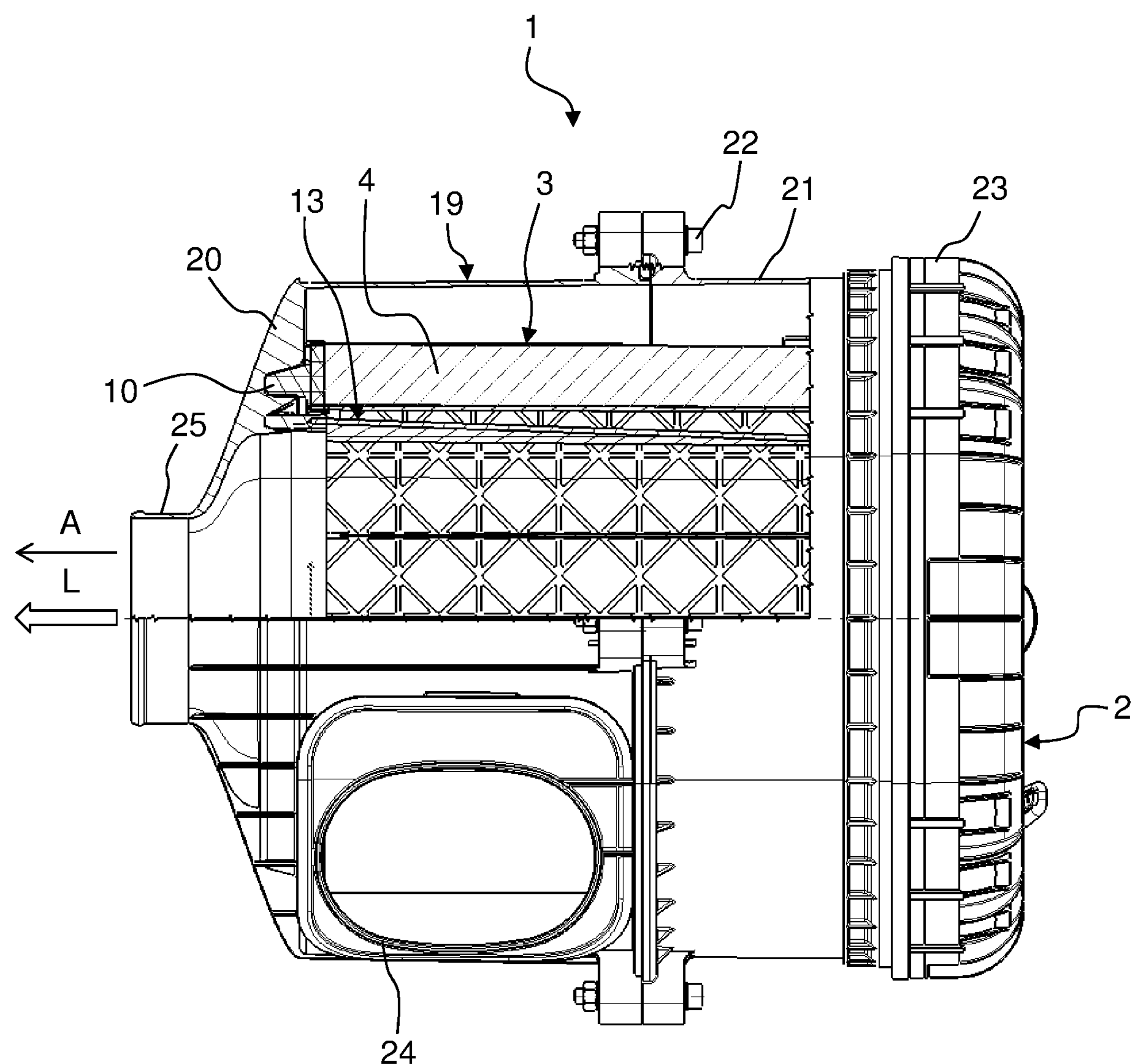
FIG. 4: shows a schematic partially sectional view of the filter arrangement according to FIG. 1.
Figure 5:
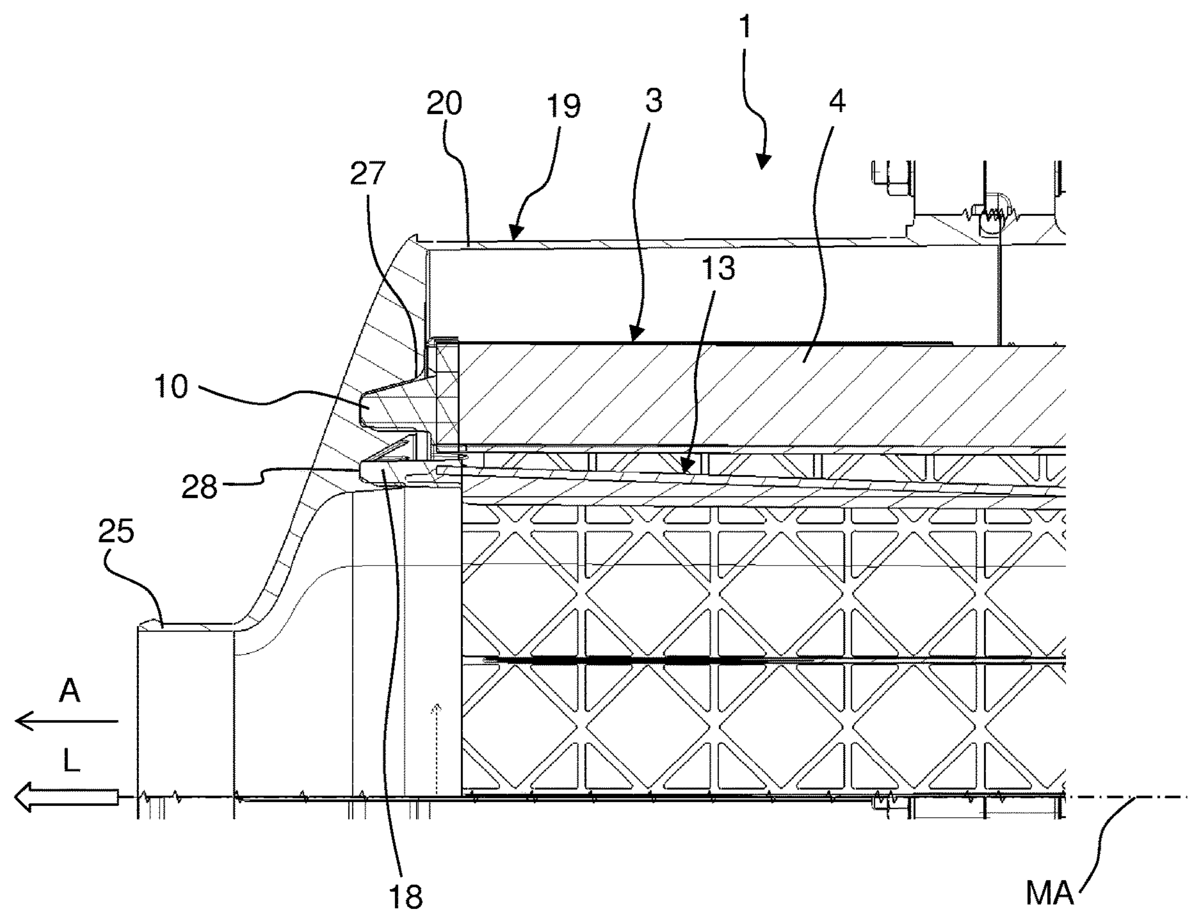
FIG. 5: shows a schematic partially sectional view of the filter arrangement according to FIG. 1.

FIG. 1 shows a schematic perspective view of an embodiment of a filter arrangement 1. FIG. 2 shows a front view of the filter arrangement 1. FIG. 3 shows a side view of the filter arrangement 1. FIG. 4 and FIG. 5 each show partially sectional views of the filter arrangement 1.

Figure 6:
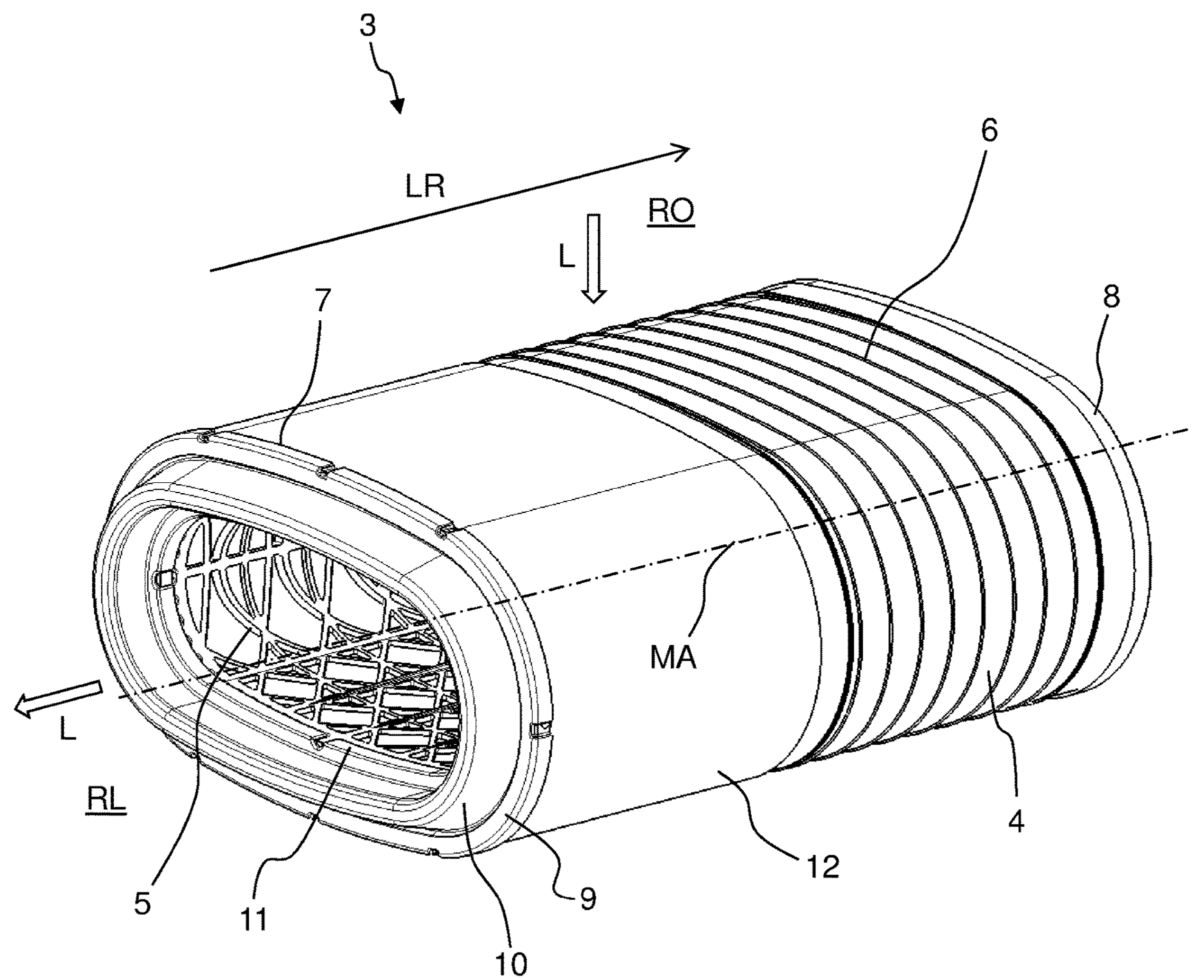
FIG. 6: shows a schematic perspective view of an embodiment of a filter element.

The filter arrangement 1 includes a filter receptacle 2 and a filter element 3 arranged in the filter receptacle 2. The filter receptacle 2 may also be referred to as a housing or filter housing. The filter element 3 is shown in FIG. 6. The filter arrangement 1 is preferably used as an intake air filter for internal combustion engines, for example in motor vehicles, trucks, construction vehicles, watercraft, rail vehicles, agricultural machinery and vehicles, or aircraft. The filter element 3 is in particular suitable for filtering combustion air of an internal combustion engine. The filter element 3 is preferably an air filter element.

The filter element 3, which may also be referred to as a primary element or main element, includes a filter body 4, which surrounds a central tube 5 and preferably bears thereagainst, in such a way that the central tube 5 may perform a supporting function for the filter body as fluid passes therethrough. By way of example, the filter body 4 can be wound as a winding made of a filter medium onto the central tube 5 or may bear thereagainst in an annularly closed manner, for example in the form of a bellows folded in a star pattern. The central tube 5 is preferably formed in a lattice-like manner and is therefore fluid-permeable. The filter body 4 is preferably folded. For stabilization, a thread winding 6, i.e. a tape or thread saturated in melt adhesive or another adhesive, can be wound around the folded filter medium, or the folded filter medium can be fixed by means of circular or spiraled adhesive beads. The filter medium is for example a filter paper, a filter fabric, a filter non-woven fabric, or a filter fleece. In particular, the filter medium can be produced in a spun-bonded fabric or meltblown method or may include a fiber layer applied to a fleece or cellulose support. The filter medium may also be matted or needled. The filter medium may contain natural fibers, such as cellulose or cotton, or synthetic fibers, for example made of polyester, polyvinyl sulfite or polytetrafluoroethylene. The fibers, during processing, may be oriented in, at an incline and/or transversely to the machine direction or may be oriented in an unordered manner.

The filter element 3 has a first, in particular open end plate 7 and a second, in particular closed end plate 8. The end plates 7, 8 are preferably fabricated from a plastics material. By way of example, the end plates 7, 8 can be formed as economical plastics injection-moulded components. The end plates 7, 8 may be fabricated for example from a polyurethane material that in particular is cast in casting molds and is preferably foamed. The end plates 7, 8 may be integrally cast on the filter body 4. The filter body 4 is arranged between the end plates 7, 8. On a front side 9 of the first end plate 7 facing away from the filter body 4, there is provided a sealing arrangement 10 for sealing of the filter elements 3 with respect to the filter receptacle 2. The sealing arrangement 10 is designed to seal off the filter elements 3, in particular radially, with respect to the filter receptacle 2.

The filter medium of the filter body 4 can be fused, bonded or welded to the end plates 7, 8. The second end plate 8 is for example flat and preferably fluid-impermeable. A receiving opening 11 is provided in the first end plate 7, through which opening the air filtered by the filter element 3 can also exit. The filter element 3 preferably also has an incident-flow protection 12, which prevents a fluid L loaded with particles from flowing directly onto the filter medium 4. The fluid L may be air. The incident-flow protection 12 may be a film or a close-meshed net or lattice. The incident-flow protection 12 may be fluid-impermeable or fluid-permeable. The incident-flow protection 12 may be bonded, welded or fused to the filter body 4. The incident-flow protection 12 is arranged adjacently to the first end plate 7. In particular, the incident-flow protection 12 abuts the first end plate 7. The incident-flow protection 12 can be connected to the first end plate 7 in particular in a flow-impervious manner. Fluid L to be purified passes from a dirty side RO of the filter element 3 through the filter body 4 into a cavity surrounded by the central tube 5 and flows out therefrom as filtered fluid L through the receiving opening 11 on a clean side RL of the filter element 3, surrounded in particular by the filter body 4.

Figure 10:
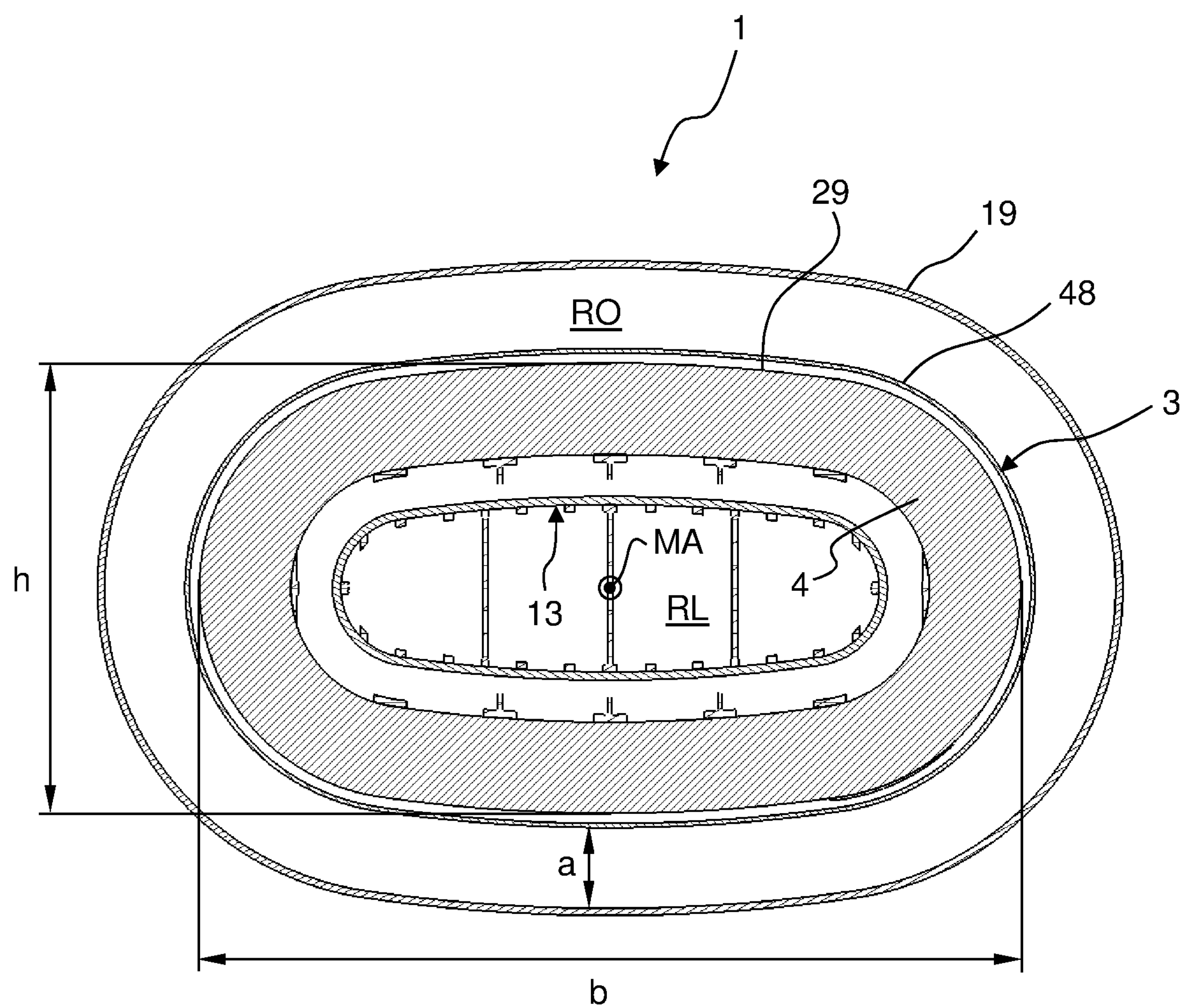
FIG. 10: shows a schematic sectional view of the filter arrangement according to the line of section X-X of FIG. 8.

The filter element 3 has, in a longitudinal direction LR thereof, preferably an oval cross section. The cross section may reduce starting from the first end plate 7 in the direction of the second end plate 8, such that the filter element 3 tapers conically. However, the filter element 3, as shown in FIG. 6, preferably has an oval cross section. This means that the filter element 3 is cylindrical with an oval base area. In the present case, the term oval can be understood to mean a shape with a non-concave, smooth outer contour, i.e. formed continuously of convex and straight portions, preferably exclusively from convex portions, for example a rectangular cross section with rounded corners, an elliptical cross section, or a cross section formed from a plurality of circular arcs. An oval outer contour or a cross section that has a center point and two axes of symmetry intersecting one another at said center point is preferably used. The filter element 3 and in particular the filter body 4 have a width b and a height h (FIG. 10). The width b is greater than the height h. The width b is preferably twice to three times the height h, and the width b is more preferably 1.5 to three times the height h.

Figure 7:
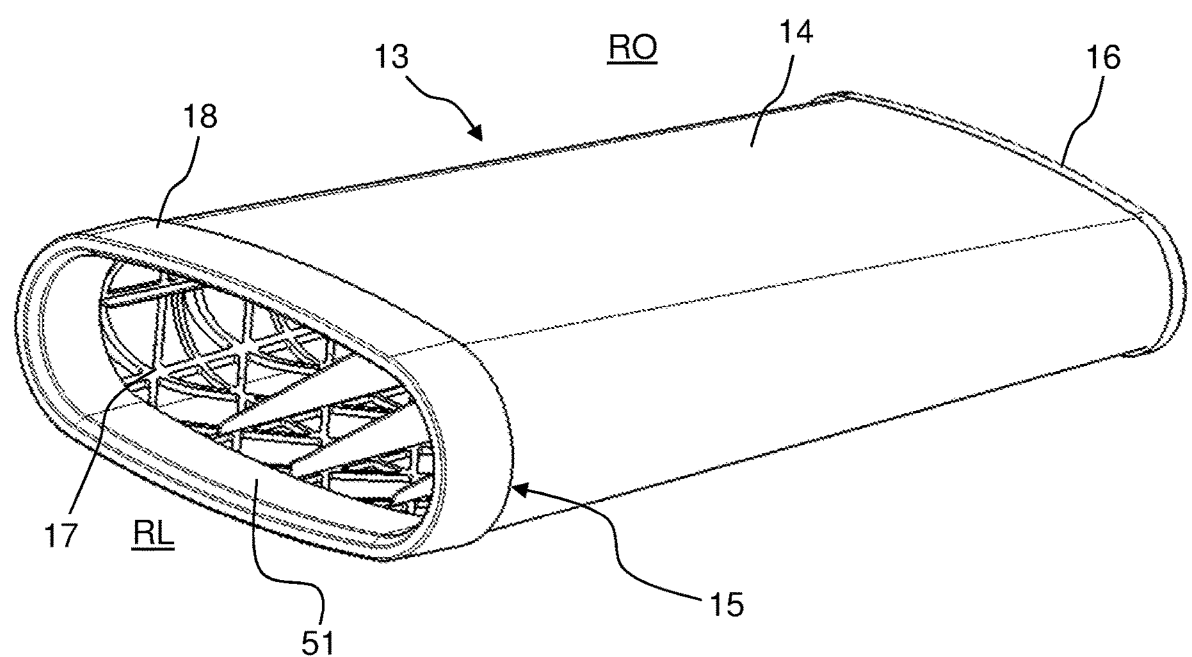
FIG. 7: shows a schematic perspective view of an embodiment of a secondary element.

A secondary element 13 shown in FIG. 7 can be received in the filter receptacle 2, surrounded by the filter element 3. Secondary elements of this type are used in particular as a safety means for the situation in which an operator opens the filter receptacle 2 during machine operation and removes the filter element 3, for example in order to dedust or replace said filter element. In particular, the filter element 3 may be referred to as a first filter element and the secondary element 13 may be referred to as a second filter element. The secondary element 13 is preferably received in the receiving opening 11. The secondary element 13 has a filter medium 14 and a first end plate 15 and a second end plate 16. The filter medium 14 is arranged between the end plates 15, 16. The filter medium 14 surrounds a lattice-like central tube 17. The secondary element 13, similarly to the filter element 3, has a dirty side RO and a clean side RL. The first end plate 15 may have a sealing arrangement 18 for sealing off the secondary element 13 with respect to the filter receptacle 2. The sealing arrangement 18 may be formed materially integrally with the first end plate 15. The filter element 3 and the secondary element 13 can be received in the filter receptacle 2. The secondary element 13 has a fluid exit opening 51. The fluid exit opening 51 can be referred to as the fluid exit opening of the filter element 3.

As shown in FIGS. 1 to 5, the filter receptacle 2 includes a receiving portion 19. The receiving portion 19 can be formed from a first housing part 20 and from a second housing part 21. The housing parts 20, 21 can be interconnected using fastening means 22, for example screws. The housing parts 20, 21 are preferably fabricated from a plastics material. Alternatively, the housing parts 20, 21 can be fabricated from sheet metal, in particular from sheet steel. By way of example, the housing part 20, 21 can be formed as economical injection-moulded components. A sealing arrangement, such as an O-ring, can be provided between the housing parts 20, 21. Alternatively, the receiving portion 19 can be formed in one part. This means that the housing parts 20, 21 form a one-piece component.

The filter receptacle 2 also has a maintenance cover 23, which can be removed from the receiving portion 19. The filter element 3 can be removed from the receiving portion 19 via the maintenance cover 23. The maintenance cover 23 can be connected to the receiving portion 19 with the aid of quick-action closures. A sealing arrangement can be provided between the maintenance cover 23 and the receiving portion 19. FIG. 2 and FIG. 3 show the filter arrangement 1 in two different installation situations, specifically in a horizontal and a vertical installation situation.

The filter receptacle 2 or the receiving portion 19 has a fluid inlet 24 for allowing the fluid L to be filtered to enter the filter receptacle 2 and has a fluid outlet 25, which in particular is central, for discharging the fluid L filtered with the aid of the filter element 3 from the filter receptacle 2. The fluid inlet 24 and the fluid outlet 25 are preferably tubular. The fluid inlet 24, as shown in FIGS. 1, 3 and 4, may have an oval cross section. With the aid of the oval cross section, of which the wider extension is oriented preferably in the direction of the longitudinal direction LR, a lower initial pressure loss can be achieved compared with a circular cross section. The fluid L to be filtered enters the fluid inlet 24 in an inflow direction E. The fluid outlet 25 preferably has a circular cross section. The fluid L exits from the fluid outlet 25 in an outflow direction A preferably parallel to the longitudinal direction of the filter element 3. The inflow direction E is oriented perpendicularly to the outflow direction A.

A particle discharge opening 26 can be provided on the maintenance cover 23. The particle discharge opening 26 is preferably tubular. Particles pre-separated from the fluid L can be removed from the filter receptacle 2 via the particle discharge opening 26. The particle discharge opening 26 may have a valve. The housing part 20, 21 and/or the maintenance cover 23 may be reinforced with ribs.

A first engagement region 27 (FIG. 5) is provided in the filter receptacle 2 and in particular in the receiving portion 19, with which engagement region the sealing arrangement 10 of the filter element 3 engages. This engagement region 27 preferably has a seal bearing surface, against which the sealing arrangement 10 can come into abutment in a sealing manner. In the present exemplary embodiment, as is shown and preferred, an oval-cylindrical seal bearing surface directed radially outwardly is provided, which follows the course of the inner surface 43 (sealing surface) of the sealing arrangement 10. A second engagement region 28 may also be provided on the receiving portion 19, with which engagement region the sealing arrangement 18 of the secondary element 13 engages. This second engagement region 28 preferably likewise has a seal bearing surface 280 (see FIG. 32), against which the sealing arrangement 18 may come into abutment in a sealing manner. In the present exemplary embodiment, as is shown and preferred, an oval-cylindrical seal bearing surface 280 directed radially outwardly is provided. The first housing part 20 may include the engagement regions 27, 28. The engagement regions 27, 28 may run around the fluid outlet 25 completely.

Figure 8:
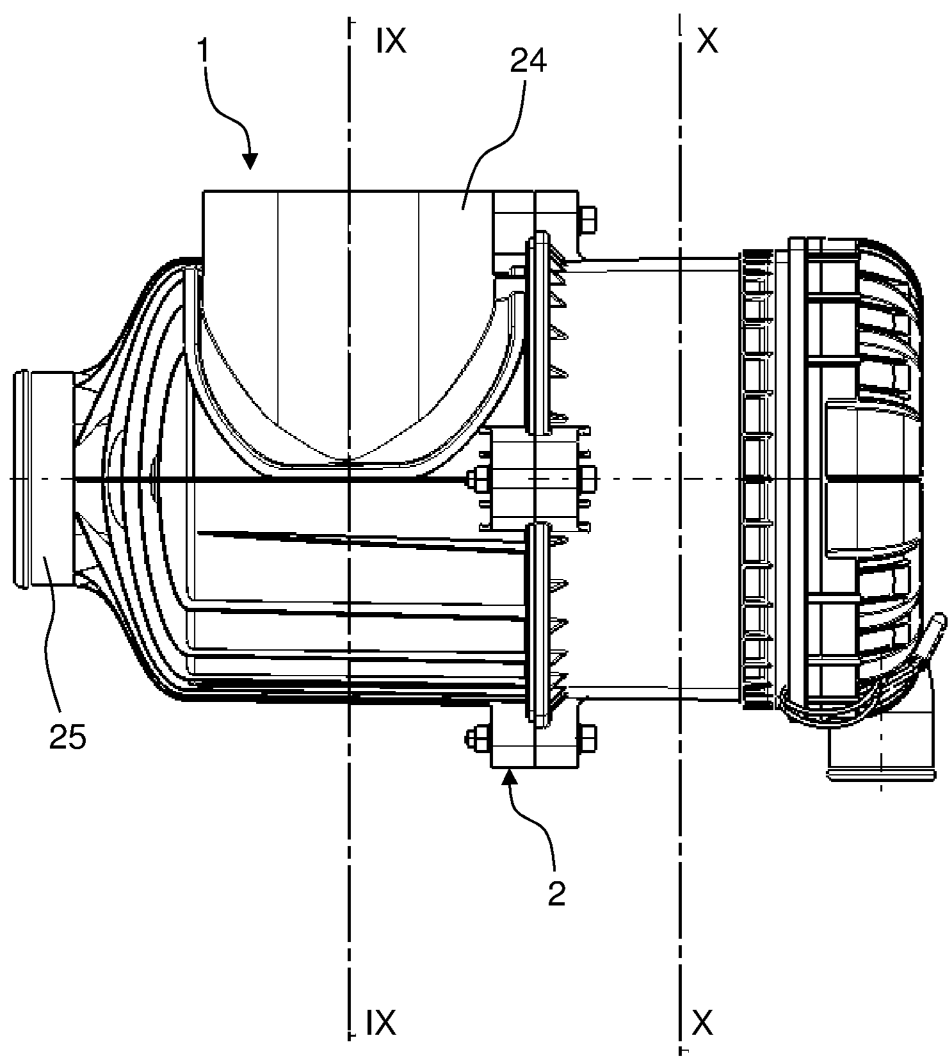
FIG. 8: shows a schematic view of the filter arrangement according to FIG. 1.
Figure 9:
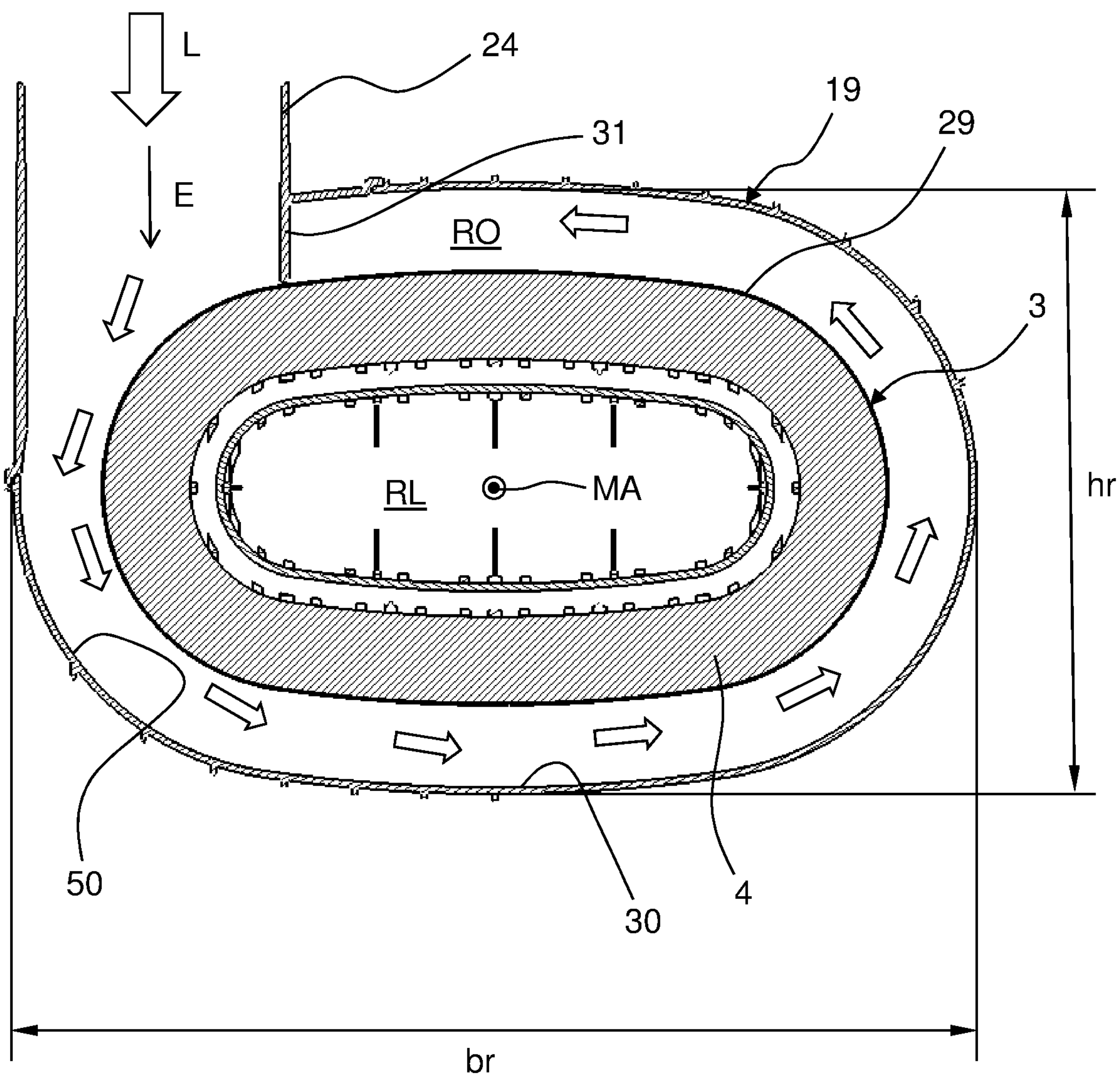
FIG. 9: shows a schematic sectional view of the filter arrangement according to the line of section IX-IX of FIG. 8.

FIG. 8 shows the filter arrangement 1 in a schematic side view. As is shown in FIG. 9 in a schematic sectional view along the line of section IX-IX of FIG. 8, the fluid inlet 24 is arranged such that the inflow direction E of the fluid L is oriented in the direction of a lateral surface 29 and perpendicularly to the longitudinal direction LR of the filter elements 3 arranged in the receiving portion 19. The lateral surface 29 forms an encasement of the filter body 4. A cylindrical, in particular oval-cylindrical geometry of the filter element 3 is formed by the end plates 7, 8 and the lateral surface 29. The fluid L to be filtered flows over the filter element 3 receivable in the receiving portion 19 such that particles contained in the fluid L to be filtered are deposited on a wall 30 of the filter receptacle 2 or of the receiving portion 19 with the aid of the centrifugal force. The receiving portion 19 thus acts as a centrifugal separator. In particular, the inflow direction E is oriented such that the fluid L to be filtered flows substantially tangentially against the filter element 3. The receiving portion 19 in cross section preferably has a width direction br and a height direction hr. The width-to-height ratio br/hr is preferably at least 4:3, more preferably at least 3:2, in particular at least 2:1 and/or at most 6:1, preferably at most 4:1, particularly preferably at most 3:1 or 2:1. For the purposes of an optimized pre-separation, ratios less than 3:1 and preferably less than 2:1 or even smaller than 1.5:1 advantageous. The fluid inlet 24 is preferably arranged such that the inflow direction E is oriented perpendicularly to the width direction br, i.e. preferably perpendicularly to the direction of the broader extension.

Since the fluid inlet 24 is oriented such that the incoming fluid L contacts a comparatively more heavily curved curvature 50 of the wall 30 of the receiving portion 19, the fluid L to be filtered is heavily accelerated and then flows around the filter element 3 tangentially and in particular in a coiled manner, spirally or helically. A good particle separation from the fluid L is thus achieved. The fluid inlet 24 can be screened off from the fluid L flowing around the filter element 3 with the aid of a wall 31, which supports the formation of a coiled flow. The separated particles are removed from the receiving portion 19 with the aid of the particle discharge opening 26. The receiving portion 19 extends in the longitudinal direction LR of the filter element 3 parallel to the lateral surface 29 of the filter element 3, such that, as shown in FIG. 10, a uniform distance a is provided between the filter element 3 and the wall 30, around the filter element 3 perpendicularly to the longitudinal direction LR.

Figure 11:
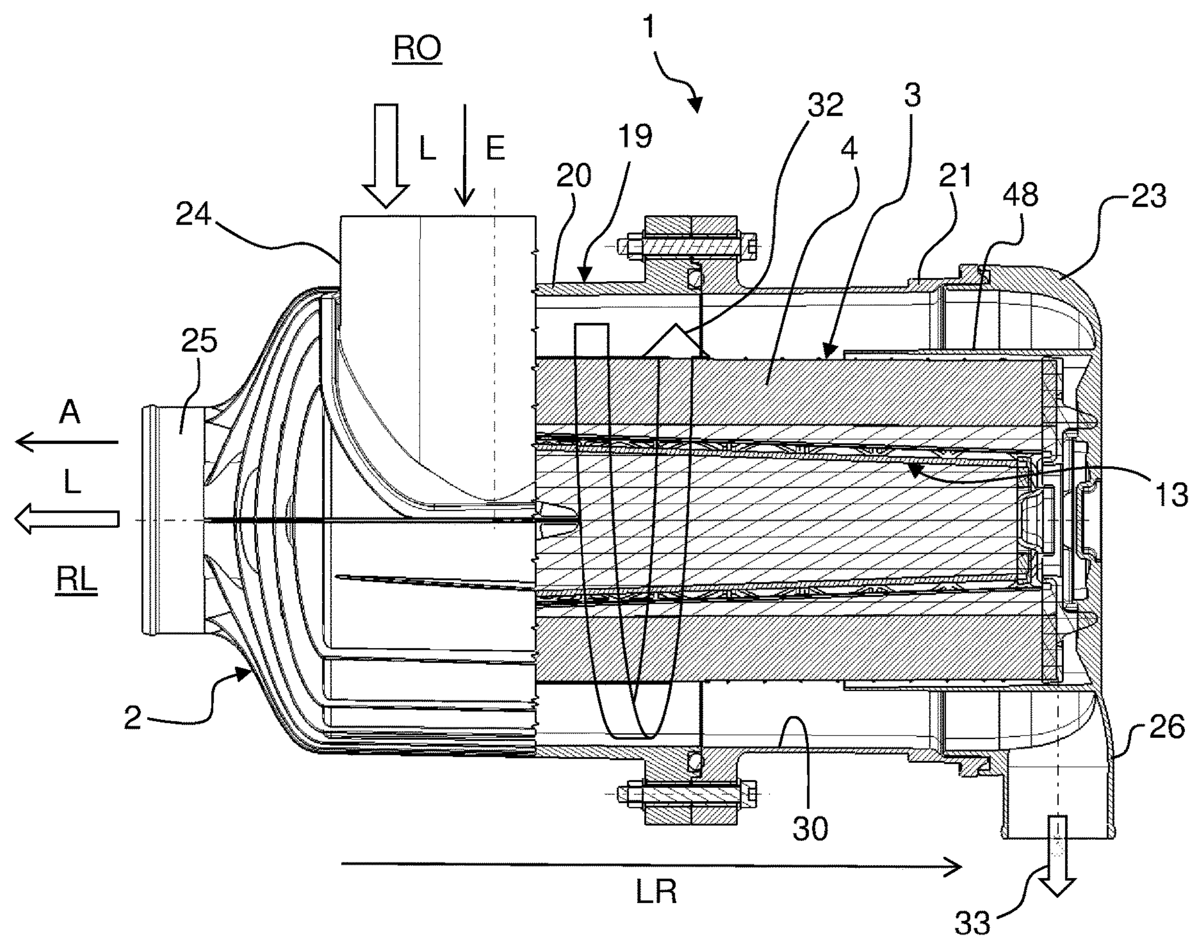
FIG. 11: shows a schematic partially sectional view of the filter arrangement according to FIG. 1.

FIG. 11 shows a partially sectional view of the filter arrangement 1. The fluid L to be filtered flows into the receiving portion 19 through the fluid inlet 24. Since the inflow direction E of the fluid L to be filtered is oriented in the direction of the lateral surface 29 of the filter element 3 and in particular is also positioned perpendicularly to the longitudinal direction LR, the fluid L to be filtered flows around the filter element 3 in a coiled manner, as shown in FIG. 11 with the aid of an arrow 32, and flows through the filter body 4 of the filter element 3 in order to flow out again from the fluid outlet 25 of the filter receptacle 2 in the outflow direction A as filtered fluid L. As the fluid flows around the filter element 3, particles 33 from the fluid L to be filtered are deposited on the wall 30 of the receiving portion 19 with the aid of the centrifugal force and can be removed from the receiving portion 19 via the particle discharge opening 26. The particles 33 may for example fall out from the particle discharge opening 26 or may be suctioned off therefrom. Due to the oval cross-sectional geometry of the receiving portion 19, a favourable particle separation is provided compared with a circular cross section, with simultaneous suitability of the system for installation spaces having a non-circular or square cross section.

FIG. 11 also shows how the maintenance cover 23 has a tubular, in particular oval-tubular incident-flow protection 48, in which the filter element 3 is at least partially received, preferably in such a way that a flow gap of a few millimeters is formed between the filter element and incident-flow protection. The incident-flow protection 48 can be formed materially integrally with the maintenance cover 23 and in particular prevents particles pre-separated by the rotating flow from still contacting the filter body 4, for example as a result of gravity.

Figure 12:
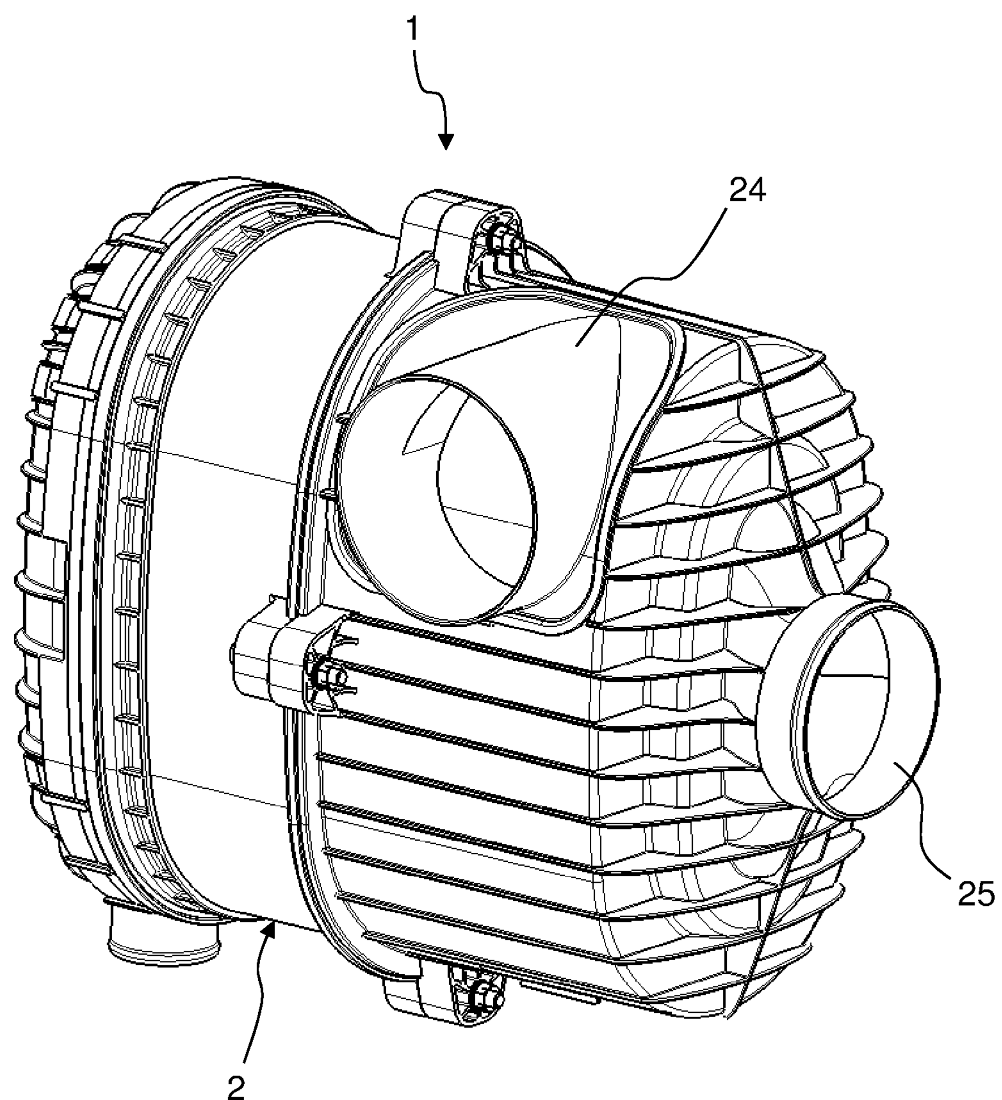
FIG. 12: shows a schematic perspective view of a further embodiment of a filter arrangement.

FIG. 12 shows a schematic perspective view of a further embodiment of a filter arrangement 1. The embodiment of the filter arrangement 1 according to FIG. 12 differs from the embodiment of the filter arrangement according to FIG. 1 merely in that the fluid inlet 24 does not have an oval cross section, but instead a circular cross section.

Figure 13:
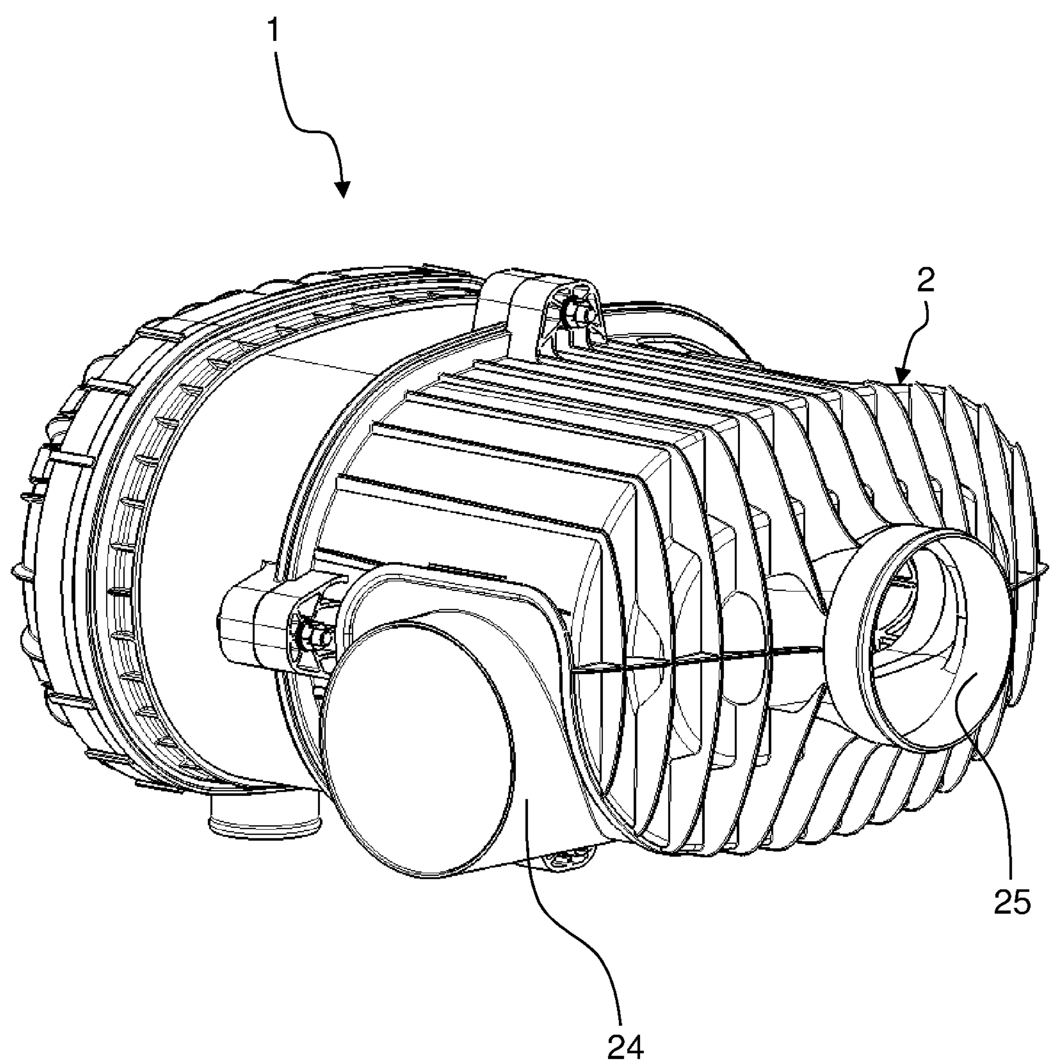
FIG. 13: shows a schematic perspective view of a further embodiment of a filter arrangement.

FIG. 13 shows a schematic perspective view of a further embodiment of a filter arrangement 1. The embodiment of the filter arrangement 1 according to FIG. 13 differs from the embodiment of the filter arrangement 1 according to FIG. 12 in that the fluid inlet 24 is positioned such that the inflow direction E of the fluid L to be filtered is arranged perpendicularly to the height direction hr of the receiving portion 19, i.e. perpendicularly to the direction of the narrower extension, and not perpendicularly to the width direction br thereof.

Figure 14:
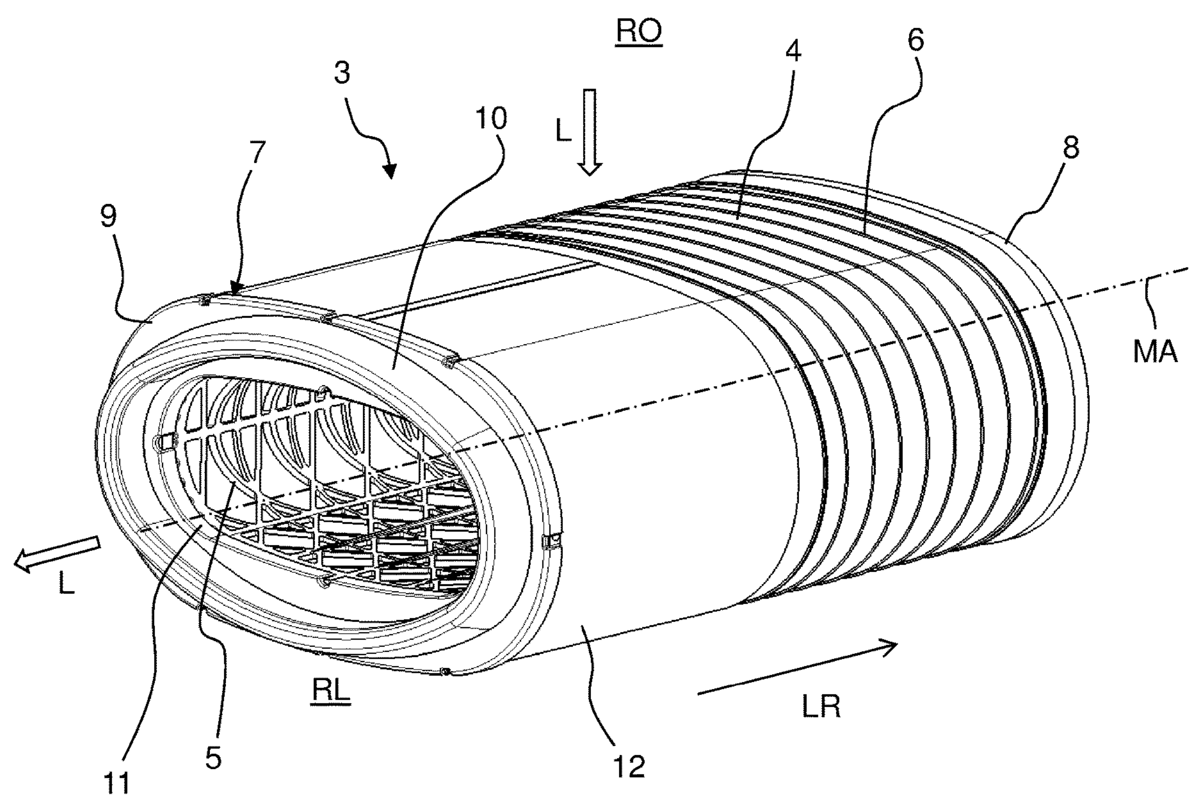
FIG. 14: shows a schematic perspective view of a further embodiment of a filter arrangement.
Figure 15:
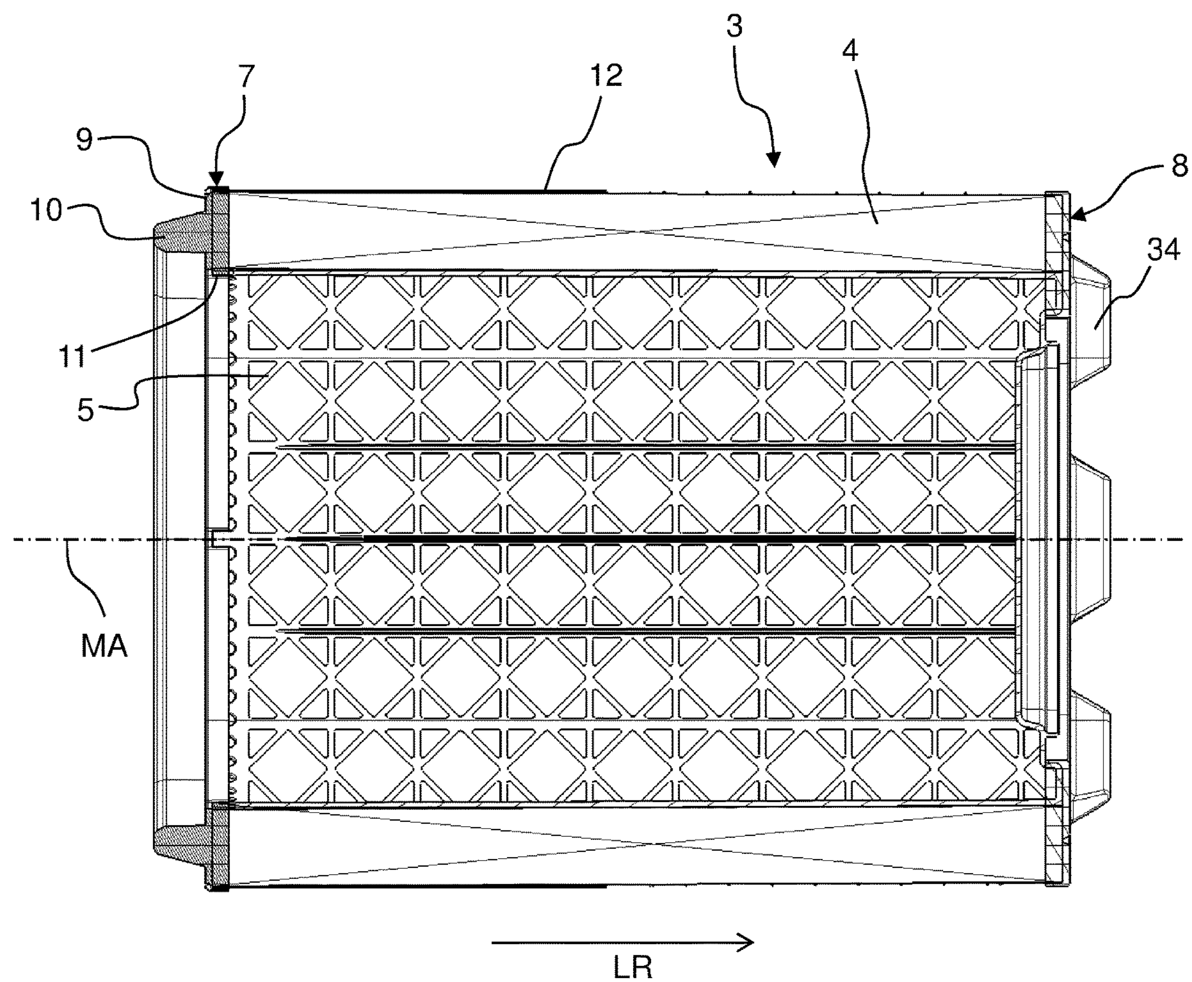
FIG. 15: shows a schematic sectional view of the filter element according to FIG. 14.
Figure 16:
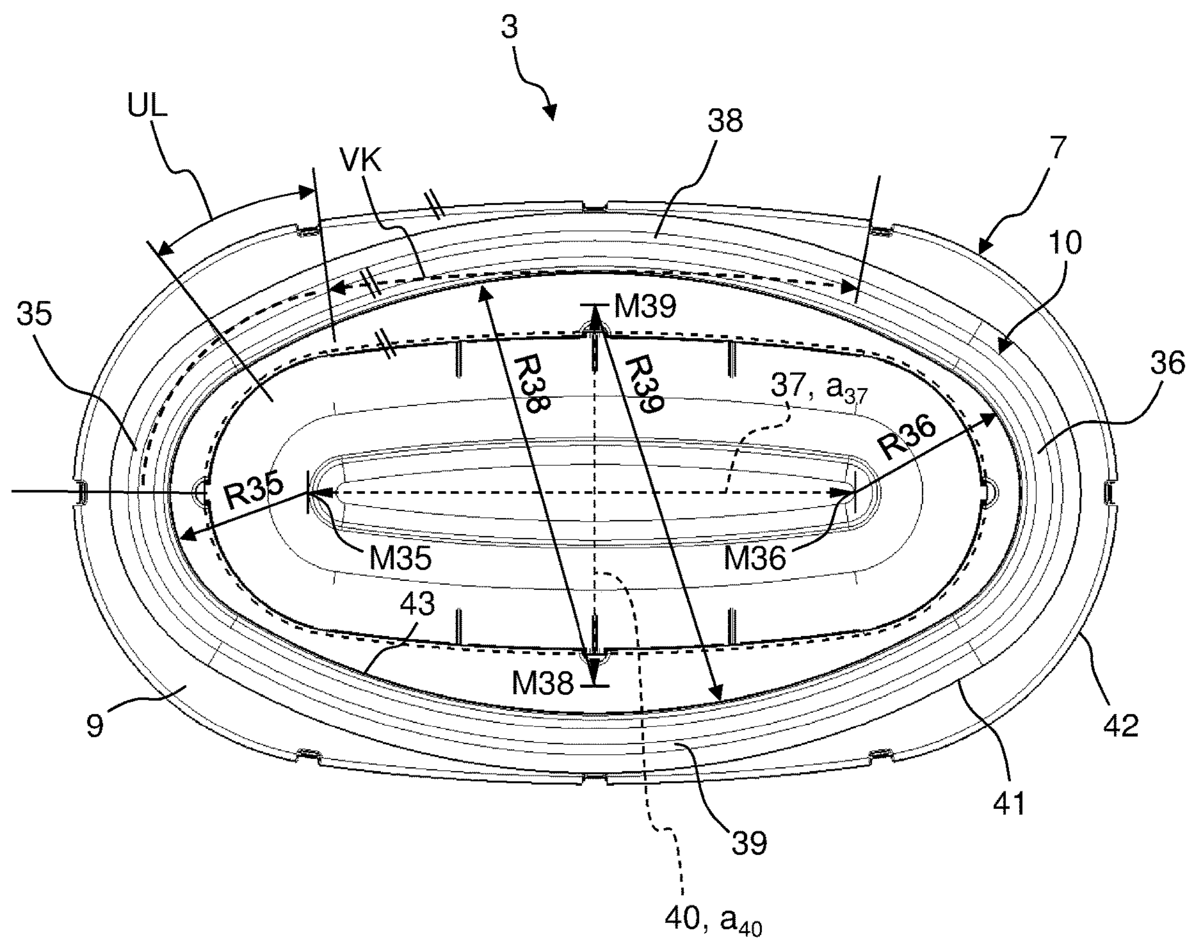
FIG. 16: shows a schematic view of the filter element according to FIG. 14.

FIG. 14 shows a schematic perspective view of a further embodiment of a filter element 3. FIG. 15 shows a sectional view of the filter element 3, and FIG. 16 shows a front view of the filter element 3. Reference will be made hereinafter simultaneously to FIGS. 14 to 16.

The construction of the filter element 3 according to FIGS. 14 to 16 corresponds substantially to the construction of the filter element 3 according to FIG. 6. The filter element 3 has a first end plate 7 and a second end plate 8. A folded filter body 4 is positioned between the end plates 7, 8. The end plates 7, 8 are preferably formed from cast, in particular foamed polyurethane, which surrounds the filter body in a sealing manner and interlockingly at the axial ends thereof. The end plates 7, 8, however, may also be formed from other materials, such as injection-moulded thermoplastic, and for example can be fused, welded or bonded to the filter body 4. The filter body 4 surrounds a lattice-like central tube 5 or a winding core. In order to filter the fluid L to be purified, this flows from a dirty side RO of the filter element 3 through the filter medium of the filter body 4 to a clean side RL of the filter element 3. The first end plate 7 has a receiving opening 11 for receiving a secondary element 13, through which the purified fluid also flows out, in accordance with FIG. 7.

The end plates 7, 8 are preferably oval. The filter body 4 may be covered in part by an incident-flow protection 12. The incident-flow protection 12 may be a fine-meshed lattice or a film which is welded, bonded or fused to the filter medium. In particular, the incident-flow protection 12 abuts the first end plate 7. The incident-flow protection 12 prevents particles 13 contained in the fluid L to be filtered entering through the fluid inlet from coming into direct contact with the filter medium.

The second end plate 8 is preferably fluid-impervious, such that no fluid L can pass therethrough from the dirty side RO to the clean side RL of the filter element 3. The second end plate 8 may for example have bracing elements 34, of which only one is provided with a reference sign in FIG. 15. These can be formed as elastically deformable extensions protruding in the longitudinal direction LR from the end plate 8, which can be supported on the maintenance cover 23 during mounting thereof and which are elastically braced by the mounting of the maintenance cover 23. The number of bracing elements 34 is arbitrary. With the aid of the elastically deformable bracing elements 34, the filter element 3 can be optimally positioned in the receiving portion 19 of the filter receptacle 2 with respect to a longitudinal direction LR of the filter element 3. The bracing elements 34 also serve for vibration damping and/or tolerance compensation. The second end plate 8 is preferably formed materially integrally with the bracing elements 34. By way of example, the second end plate 8 can be formed from a polyurethane foam.

An elastically deformable sealing arrangement 10 for sealing off the filter element 3 with respect to the receiving portion 19 is provided on the first end plate 7 and in particular on a front side 9 of the first end plate 7 facing away from the filter body 4. The sealing arrangement 10 is spring-elastically deformable. The first end plate 7 and the sealing arrangement 10 are preferably materially integral. By way of example, the first end plate 7 and the sealing arrangement 10 can be fabricated from a polyurethane foam. The sealing arrangement 10 runs around the first end plate 7 completely. The sealing arrangement 10 is located completely within the cross section of the filter body 4, projected in particular in the longitudinal direction LR.

As shown in FIG. 16, the sealing arrangement 10 has two first mutually opposed convex curvature portions 35, 36. The first curvature portions 35, 36 each have a first radius of curvature R35, R36. The radii of curvature R35 and R36 are preferably of identical size. The radii of curvature R35 and R36 have curvature center points M35 and M36 respectively. The curvature center points M35 and M36 lie on a common straight line 37.

The sealing arrangement 10 also has two mutually opposed second convex curvature portions 38, 39. The first curvature portions 35, 36 and the second curvature portions 38, 39 are interconnected in a materially integral manner. The second curvature portions 38, 39 have second radii of curvature R38, R39. The second radii of curvature R38, R39 are identical. Curvature center points M38 and M39 of the radii of curvature R38 and R39 lie on a common straight line 40. The straight line 40 is arranged perpendicularly to the straight line 37. The straight line 37 has a length $a_{37}$ and the straight line 40 has a length $a_{40}$. The straight line 40 preferably divides the straight line 37 centrally, and vice versa. The straight line 40 and the straight line 37 preferably intersect one another at a center point, through which a central axis MA of the filter element 3 extends in the longitudinal direction LR, said central axis preferably overlapping a central axis of the filter receptacle 2 when the filter element 3 is installed in the filter receptacle 2. The sealing arrangement 10 also has an outer contour 41. The outer contour 41 does not extend parallel to an outer contour 42 of the first end plate 7. The second radii of curvature R38, R39 are greater than the first radii of curvature R35, R36. The secondary element 13 may have a sealing arrangement 18 formed in a similar manner.

In FIG. 16 it can also be seen how the contour of the sealing arrangement 10 extends compared with a comparison curve VK. The comparison curve VK extends in the specific, shown embodiment, and also particularly preferably, parallel to the outer and/or inner contour of the filter body 4 and to the outer and/or inner contour of the open end plate 7 and is more preferably concentric therewith. The comparison curve has, in the middle of the two curvature portions 38, 39, the same distance from the outer and inner contour of the filter body 4 and from the outer and inner contour of the open end plate 7 as the inner face 43. As can also be seen from FIG. 16, the sealing arrangement 10 is more heavily curved in its second curvature portion 38 than the comparison curve VK. In other words, the second curvature portion 38 of the sealing arrangement 10 has, in its middle, a shorter (preferably the shortest) distance from the outer contour of the end plate 7 or the filter body 4 than in the region of the transition from the second curvature portions 38, 39 to the first curvature portions 35, 36. As can also be seen from FIG. 16, the above-described geometry means that the second curvature portions 38, 39 of the sealing arrangement 10 protrude in a region of overlap into the more heavily curved curvature portions of the end plate 7 and of the filter body 4. In this region of overlap UL the distance of the sealing arrangement 10 or the inner surface 43 from the outer contour of the end plate 7 or of the filter body 4 is maximal. The width of the end plate 7 can therefore be used to design the most heavily curved sealing arrangement 7 possible and therefore to attain a good sealing effect.

Figure 17:
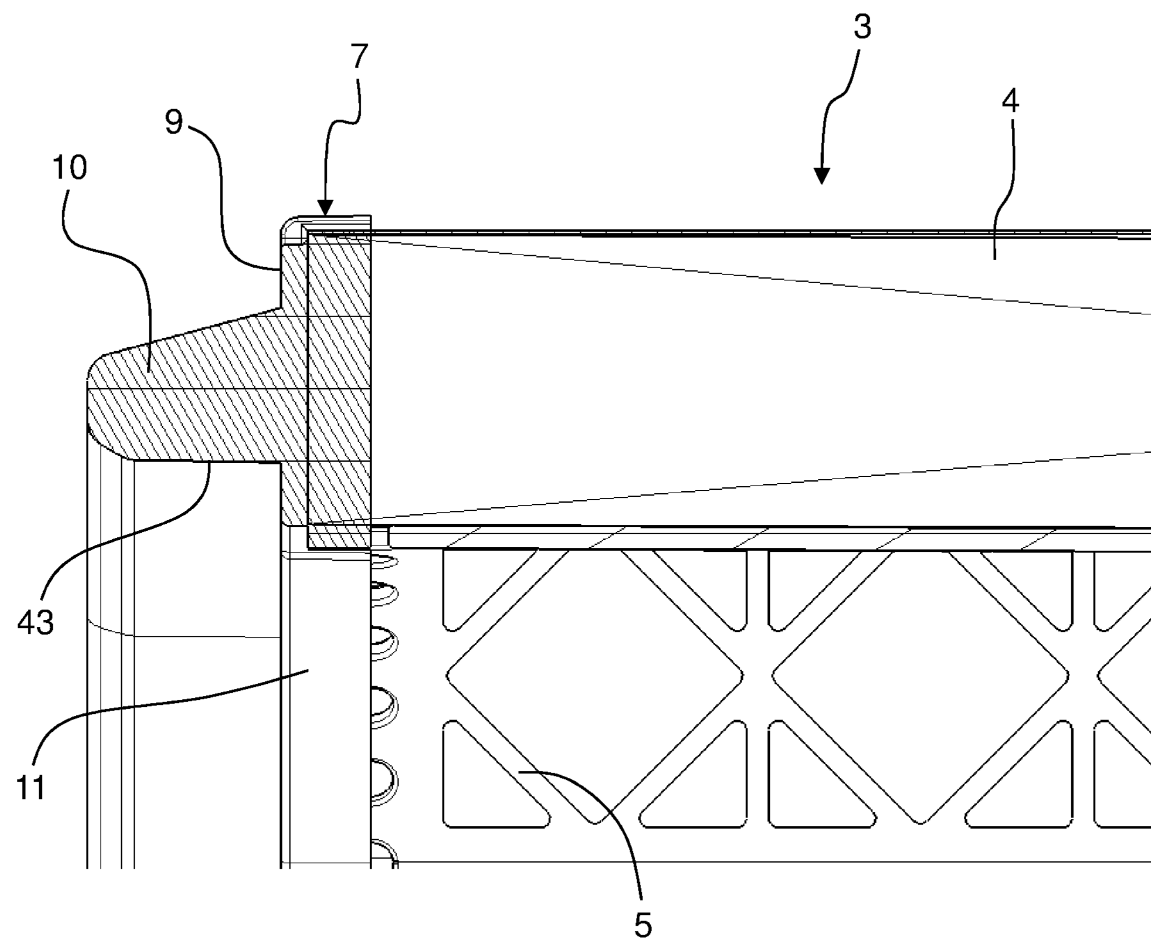
FIG. 17: shows a schematic partially sectional view of the filter element according to FIG. 14.
Figure 18:
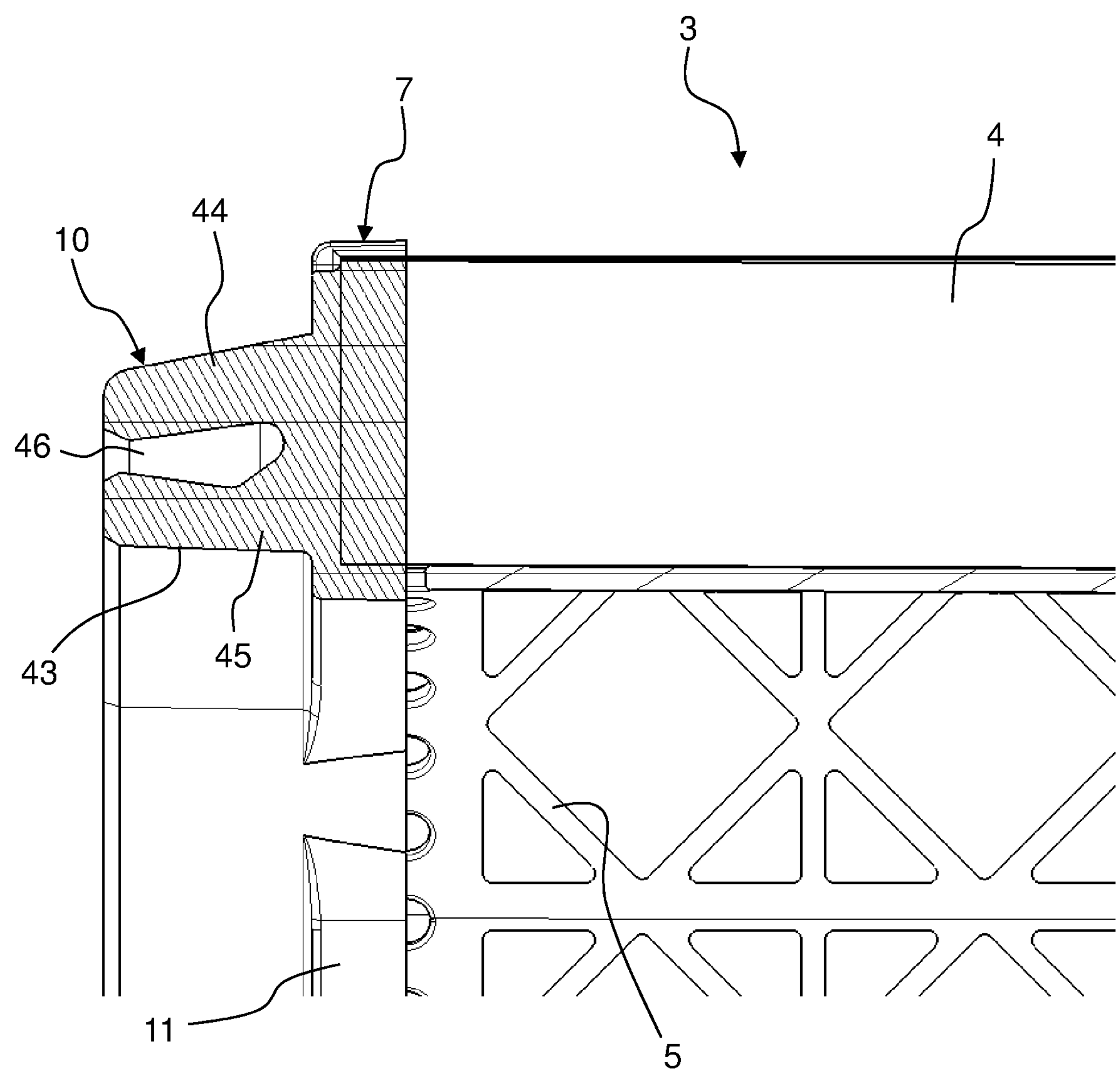
FIG. 18: shows a schematic partially sectional view of a further embodiment of a filter element.

As shown in FIGS. 17 and 18, the sealing arrangement 10 has an oval-cylindrical inner surface 43, which forms the sealing surface and bears in a sealing manner against the engagement region 27 of the receiving portion 19 of the filter receptacle 2, in particular against a corresponding seal bearing surface, when the sealing arrangement 10 engages with the engagement region 27. In the event of engagement with the engagement region 27, the sealing arrangement 10 is spring-elastically deformed, in particular widened, in particular in such a way that the bracing of the sealing arrangement 10 against the engagement region 27 is produced exclusively by the spring-elastic deformation. Here, the inner surface 43 bears in a planar and sealing manner against the engagement region 27. A constant contact pressure between the inner surface 43 and the engagement region 27 is attained preferably with the aid of the curvature portions 35, 36, 38, 39. As can also be shown in FIG. 17, the sealing arrangement 10 may have an approximately rectangular geometry in cross section. Furthermore, the sealing arrangement 10, as shown in FIG. 18, may have two sealing lips 44, 45, between which a groove-like cavity 46 is arranged. A sealing arrangement 10 that is better protected against external influences can thus be formed in that a tubular web arranged on the filter receptacle engages with the groove-like cavity in such a way that the inner and/or outer sealing lip can be placed sealingly against the tubular web. The cavity 46 may preferably be axially open for this purpose.

Figure 19:
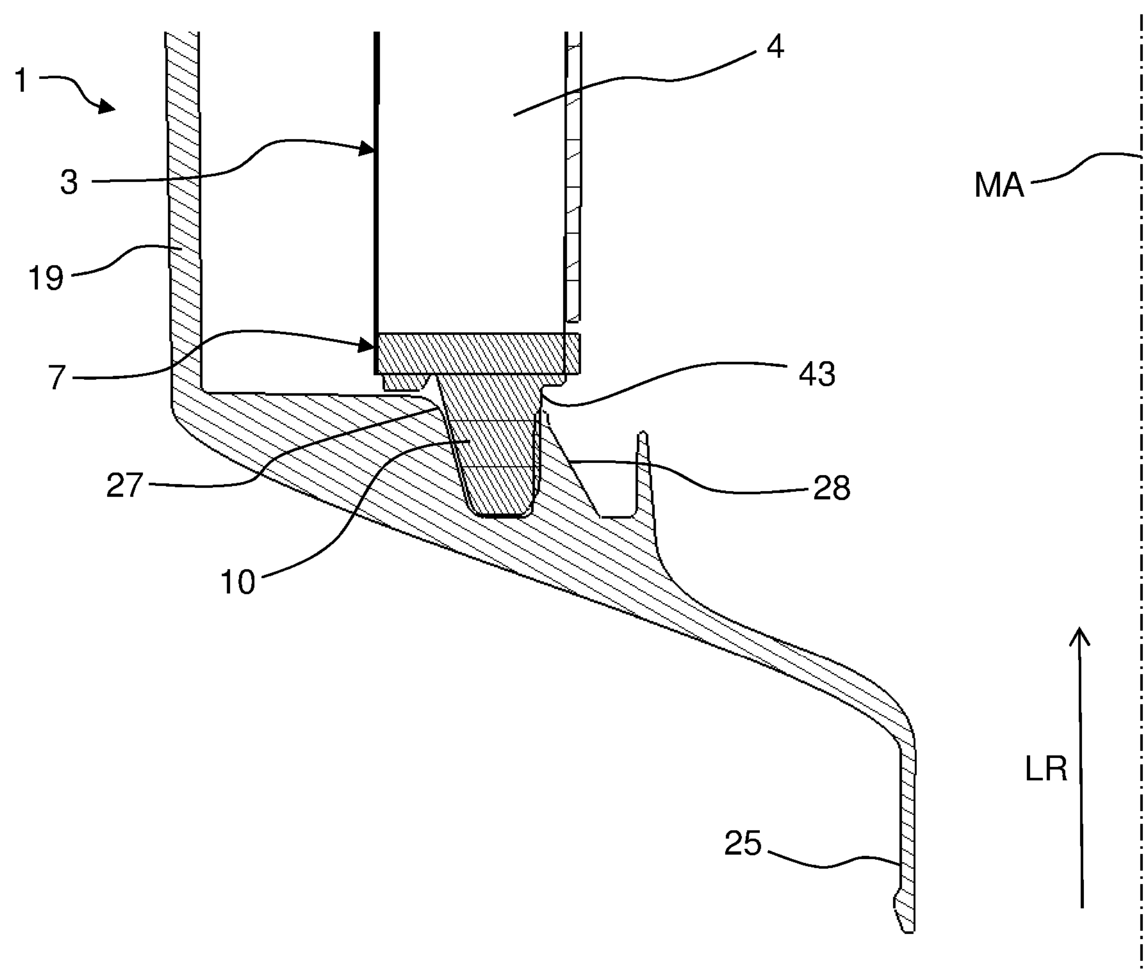
FIG. 19: shows a schematic partially sectional view of a further embodiment of a filter arrangement.
Figure 32:
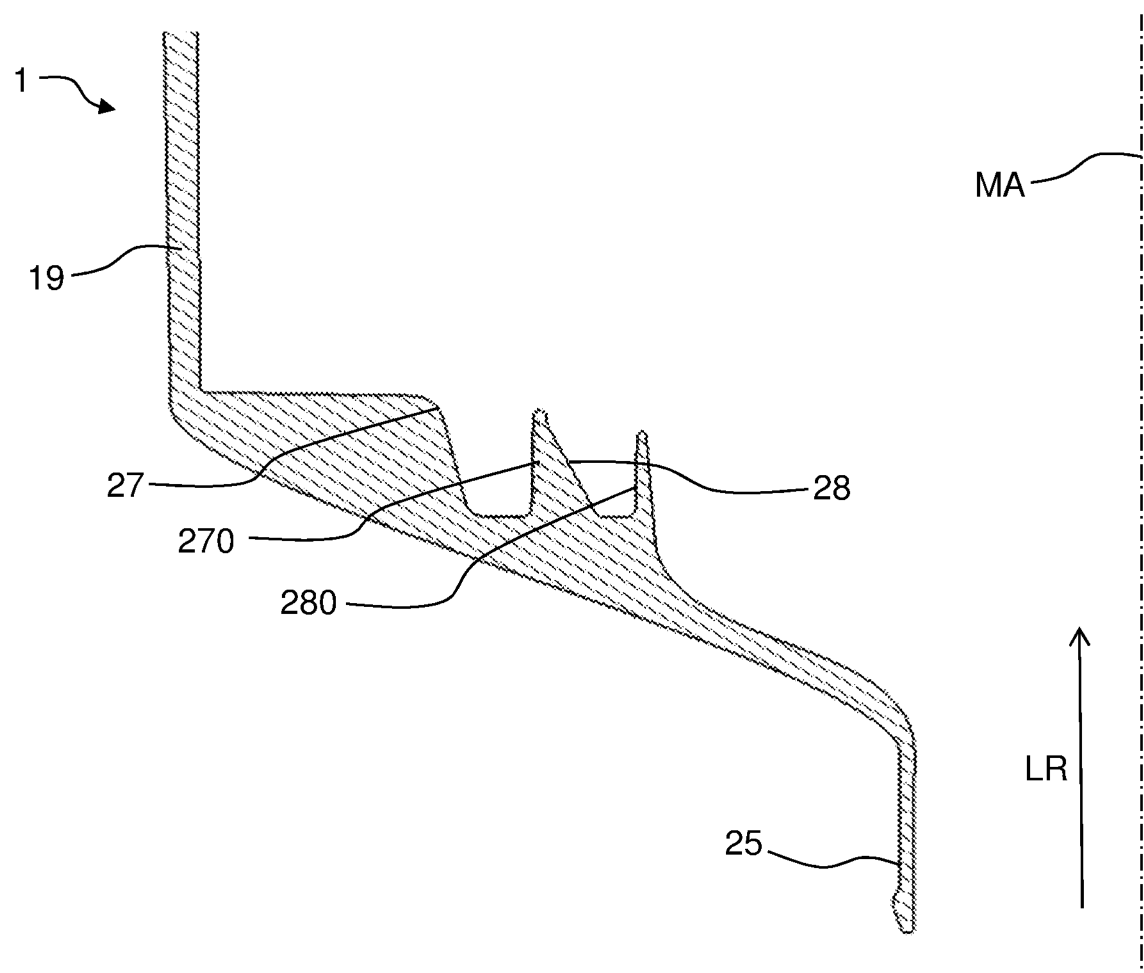
FIG. 32: shows a schematic partially sectional view of the embodiment of a filter arrangement according to FIG. 19 without illustration of the filter element.

As shown in detail in FIG. 19 and in FIG. 32, the sealing arrangement 10 engages with the engagement region 27 of the receiving portion 19. Here, the inner surface 43 bears in a flat and sealing manner against the engagement region 27, in particular an oval-cylindrical seal contact face 270 pointing radially outwardly there. The sealing arrangement 10 thus seals the filter element 3 radially inwardly with respect to the receiving portion 19. In the present case the term "inwardly" is understood to mean a direction pointing toward the fluid outlet 25.

Figure 20:
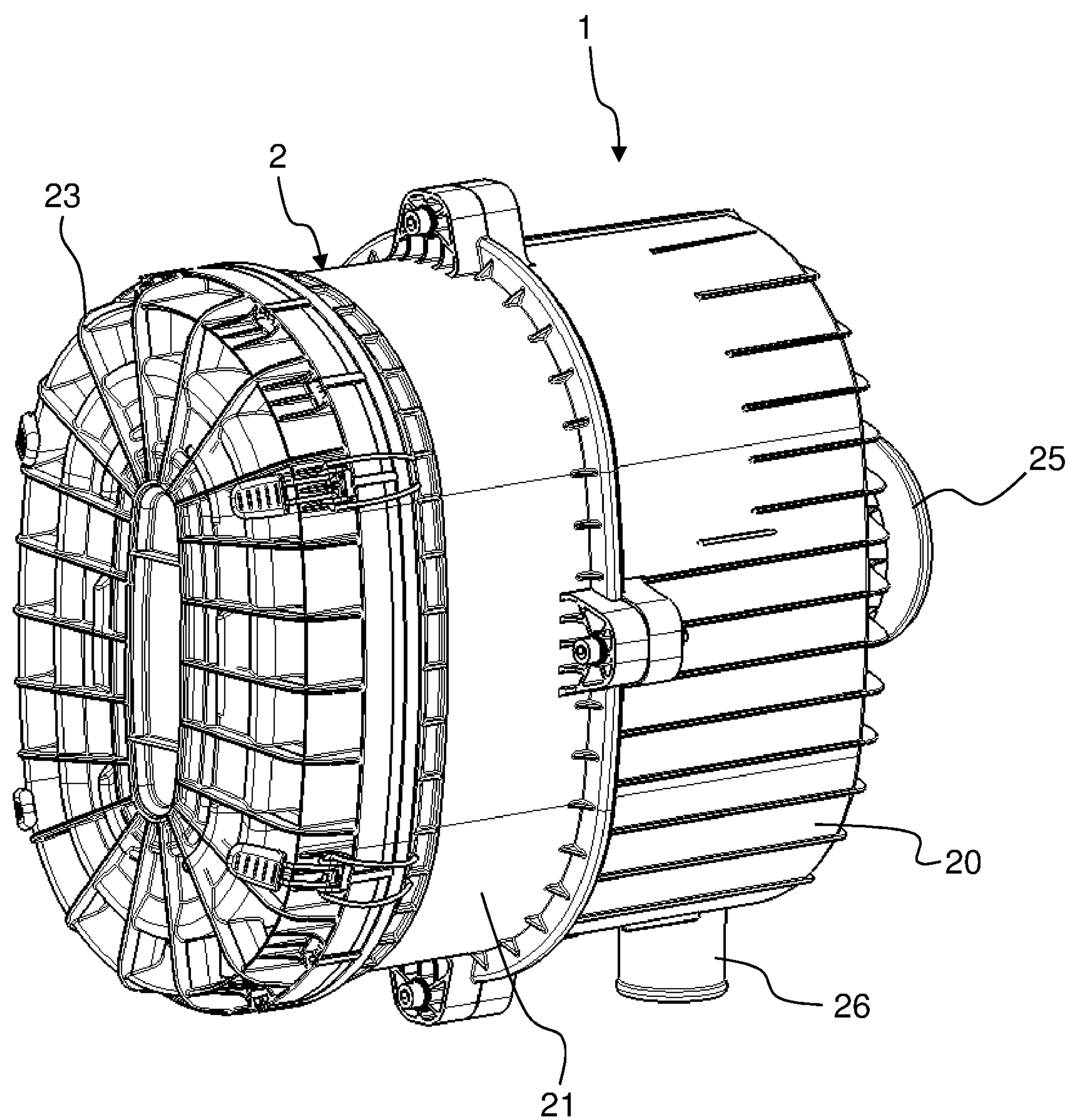
FIG. 20: shows a schematic perspective view of a further embodiment of a filter arrangement.
Figure 21:
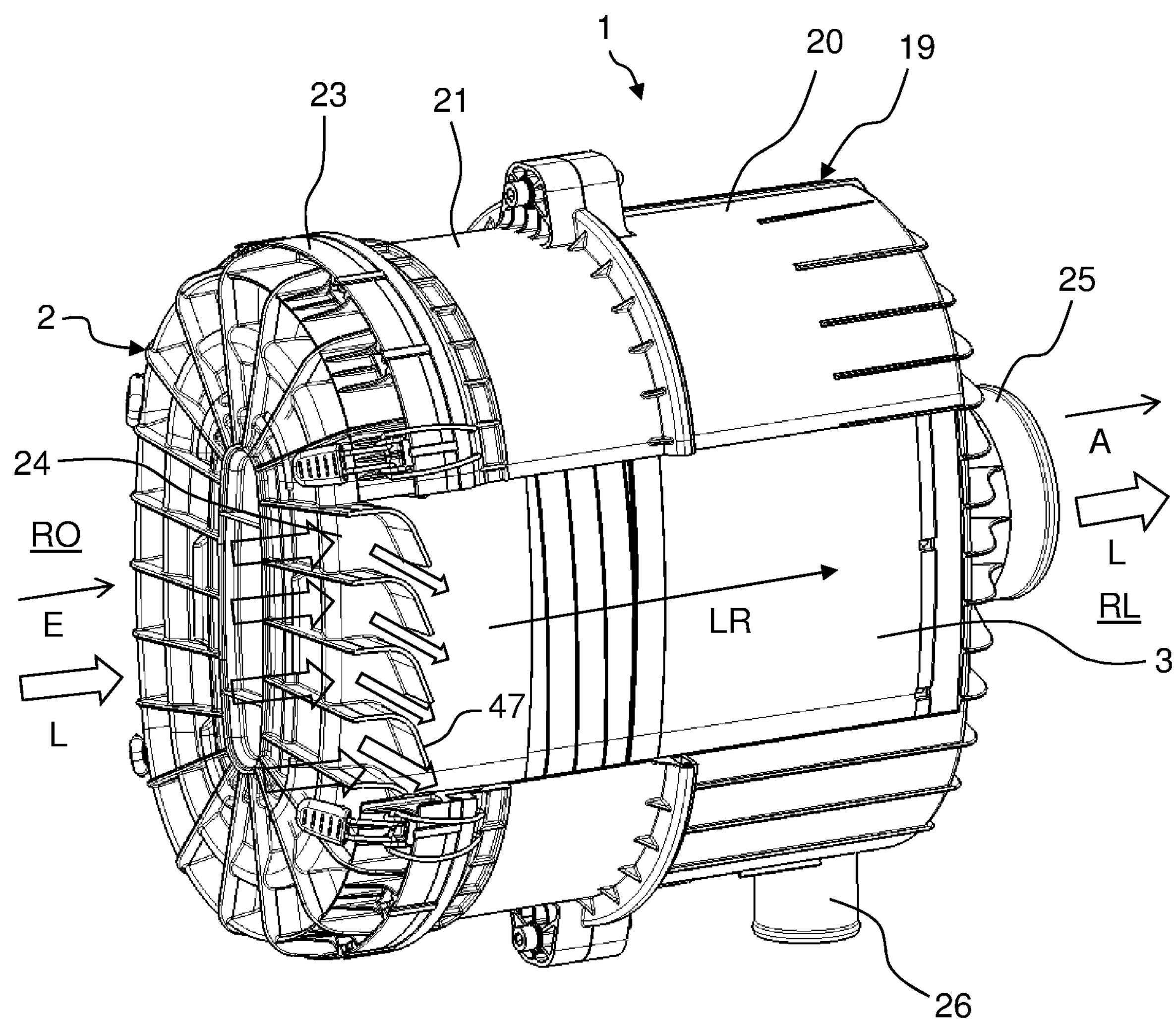
FIG. 21: shows a schematic perspective partially sectional view of the filter arrangement according to FIG. 20.
Figure 22:
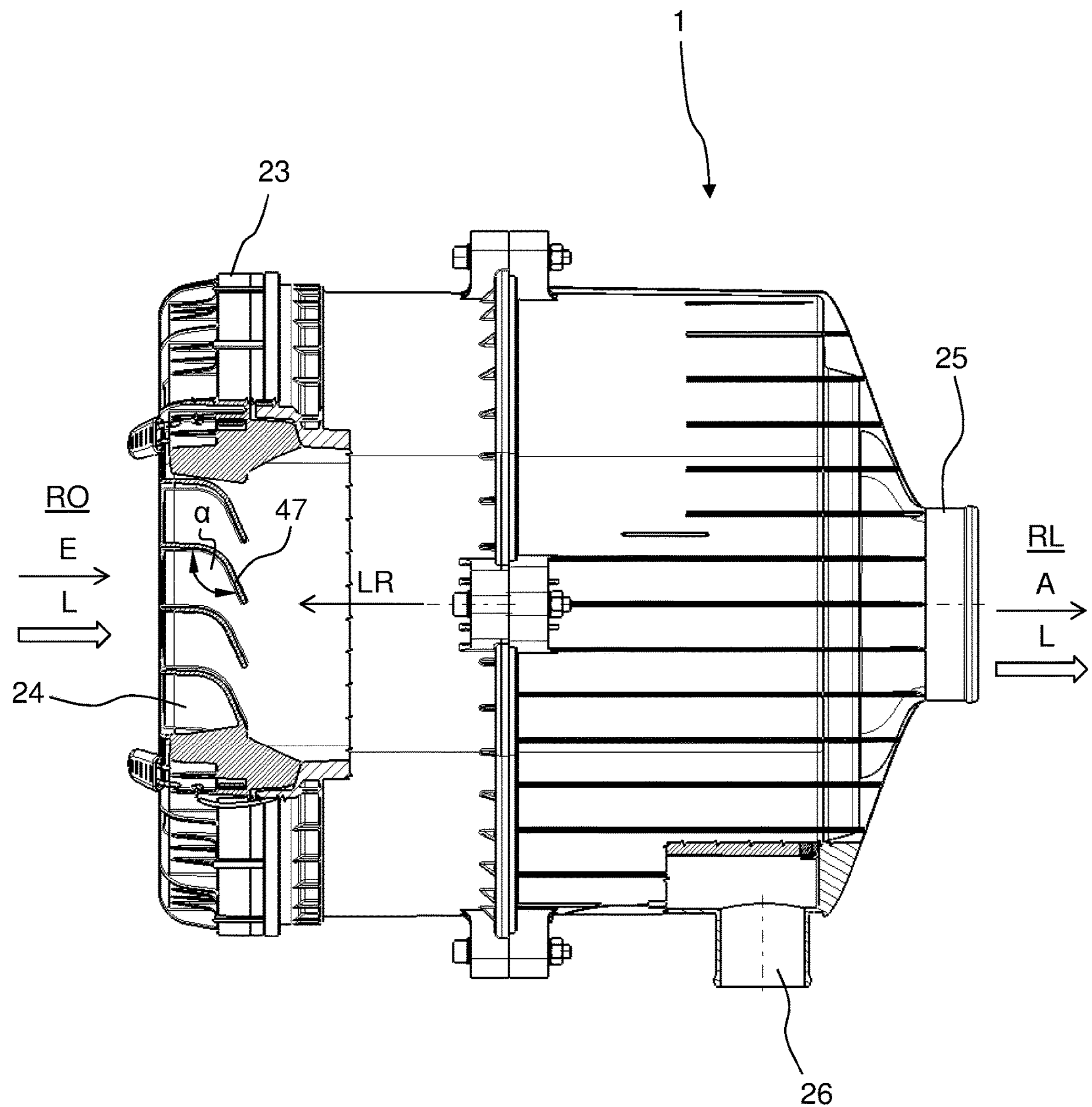
FIG. 22: shows a schematic partially sectional view of the filter arrangement according to FIG. 20.

FIG. 20, in a schematic perspective view, shows a further embodiment of a filter arrangement 1. FIG. 21 shows the filter arrangement 1 according to FIG. 20 in a schematic partially sectional view. The filter arrangement 1 includes a filter receptacle 2 and a filter element 3 arranged in the filter receptacle 2. A fluid inlet 20 for the filter receptacle 2 is oriented such that an inflow direction E of fluid L to be filtered is oriented in the direction of a longitudinal direction LR of the filter element 3. The fluid inlet 24 is preferably arranged on a maintenance cover 23 of the filter receptacle 2. Any number of fluid inlets 24 can be provided.

Figure 23:
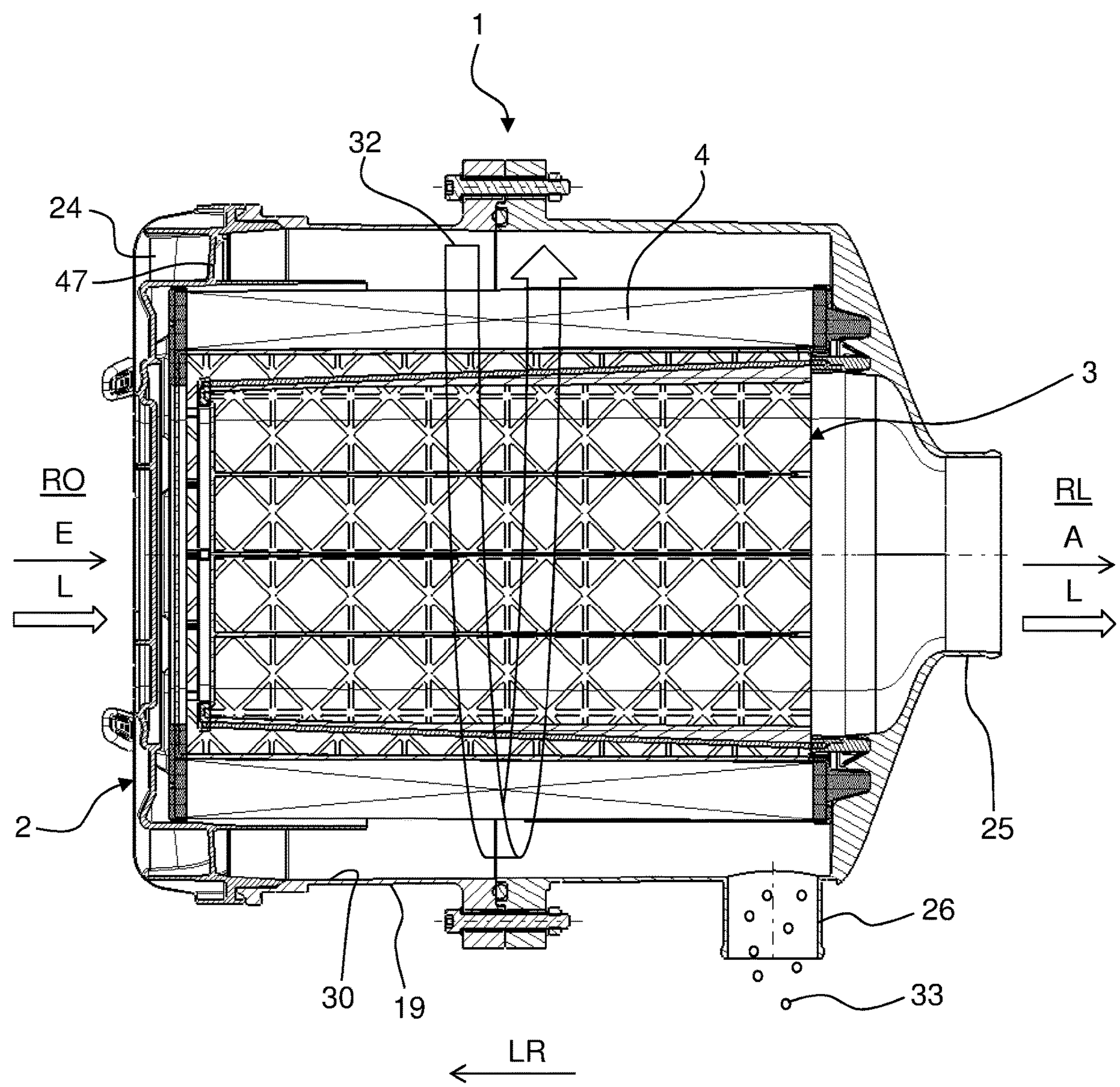
FIG. 23: shows a schematic partially sectional view of the filter arrangement according to FIG. 20.
Figure 24:
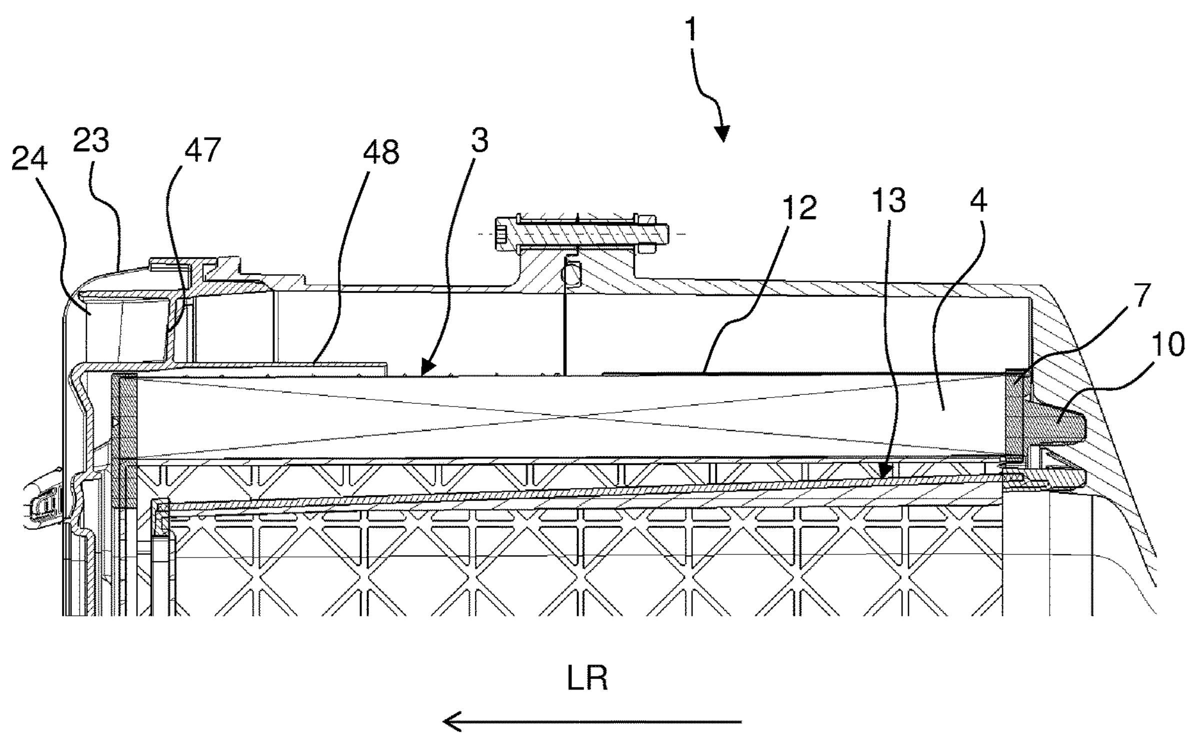
FIG. 24: shows a schematic partially sectional view of the filter arrangement according to FIG. 20.

As shown in FIGS. 21 to 24, each fluid inlet 24 has a guide element 47 for deflecting the fluid L. Each guide element 47 has an angle of curvature α the guide elements 47 are designed to deflect the incoming fluid L to be filtered such that this fluid, as shown in FIG. 23 with the aid of an arrow 32, flows around the filter element 3 in a coiled manner. Here, the filter element 3 is subject to a tangential incident flow. Particles 33 are thus deposited on a wall 30 of a receiving portion 19 of the filter receptacle 2 and can be removed from the filter receptacle 2 via a particle discharge opening 26 in the filter receptacle 2.

The guide elements 47 can be formed as guide vanes. An arbitrary number of fluid inlets 24 is preferably provided in a manner distributed over a periphery u (FIG. 25) of the filter receptacle 2. The angle of curvature α of the guide elements 47 can be varied peripherally around the filter element 3, in particular in order to produce a flow that circulates uniformly. The maintenance cover 23 may also have a tubular incident-flow protection 48 shown in FIG. 24, which is formed materially integrally with the maintenance cover 23. The incident-flow protection 48 prevents the fluid L to be filtered from flowing directly against the filter element 3, in particular in that said incident-flow protection separates the fluid inlet 24 from the filter element 3 in such a way that particles 33 are prevented from directly contacting the filter medium.

Figure 25:
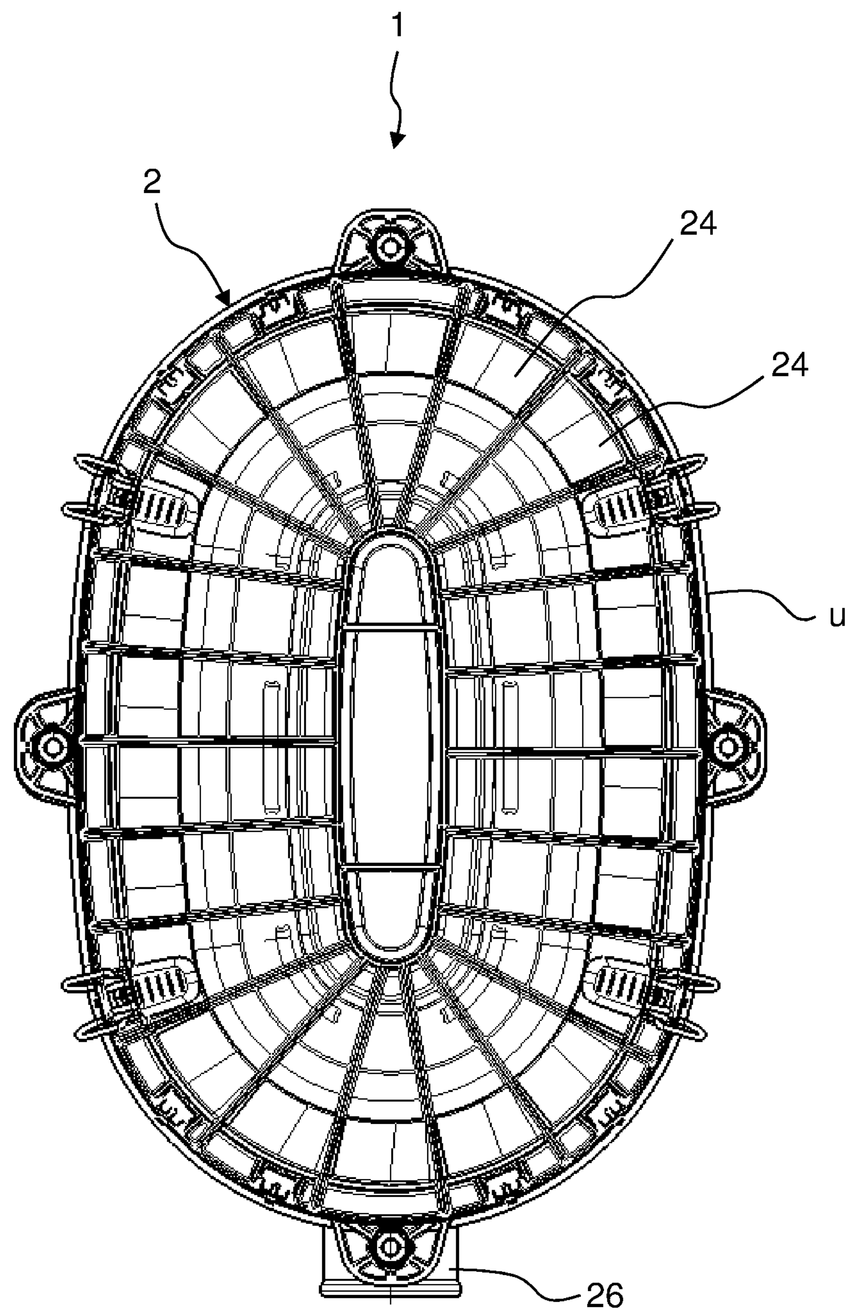
FIG. 25: shows a schematic view of the filter arrangement according to FIG. 20.

FIG. 25 shows a plan view of the filter arrangement 1. As shown in FIG. 25, a multiplicity of fluid inlets 24 may be provided, of which only two are provided with a reference sign in FIG. 25. An opening cross section of the fluid inlet 24 may vary over the periphery u of the filter receptacle 2. By way of example, opening cross sections of the fluid inlet 24 in regions with strong curvature of the filter element 3 may be larger or smaller than in regions of the filter element 3 in which this has a slight curvature.

Figure 26:
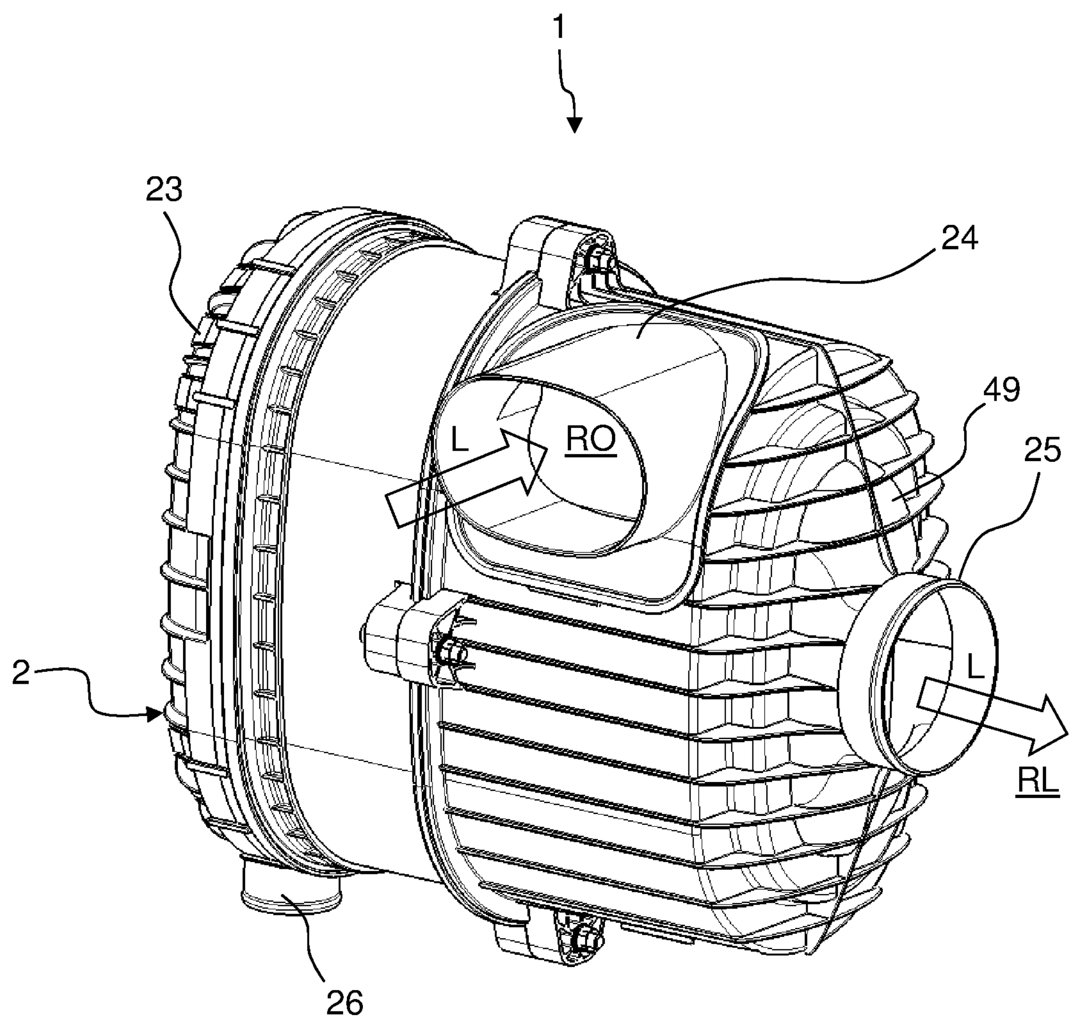
FIG. 26: shows a schematic perspective view of a further embodiment of a filter arrangement.
Figure 27:
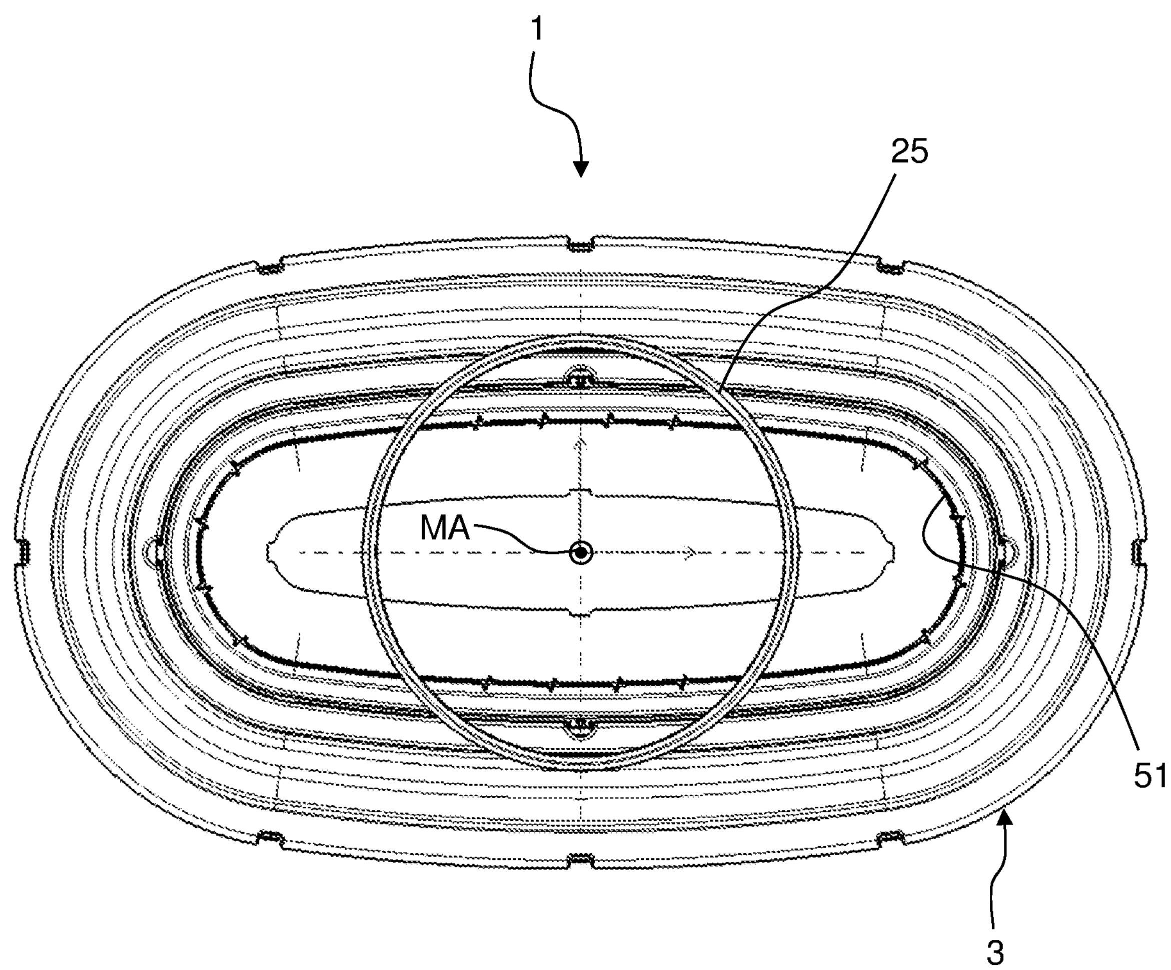
FIG. 27: shows a schematic view of the filter arrangement according to FIG. 26.

FIG. 26 shows A schematic perspective view of a further embodiment of a filter arrangement 1. FIG. 27 shows a rear view of the filter arrangement 1. The filter arrangement 1 includes a filter receptacle 2. The filter receptacle 2 according to FIG. 26 differs from the filter receptacle 2 according to FIG. 1 by a modified transition portion 49.

Figure 28:
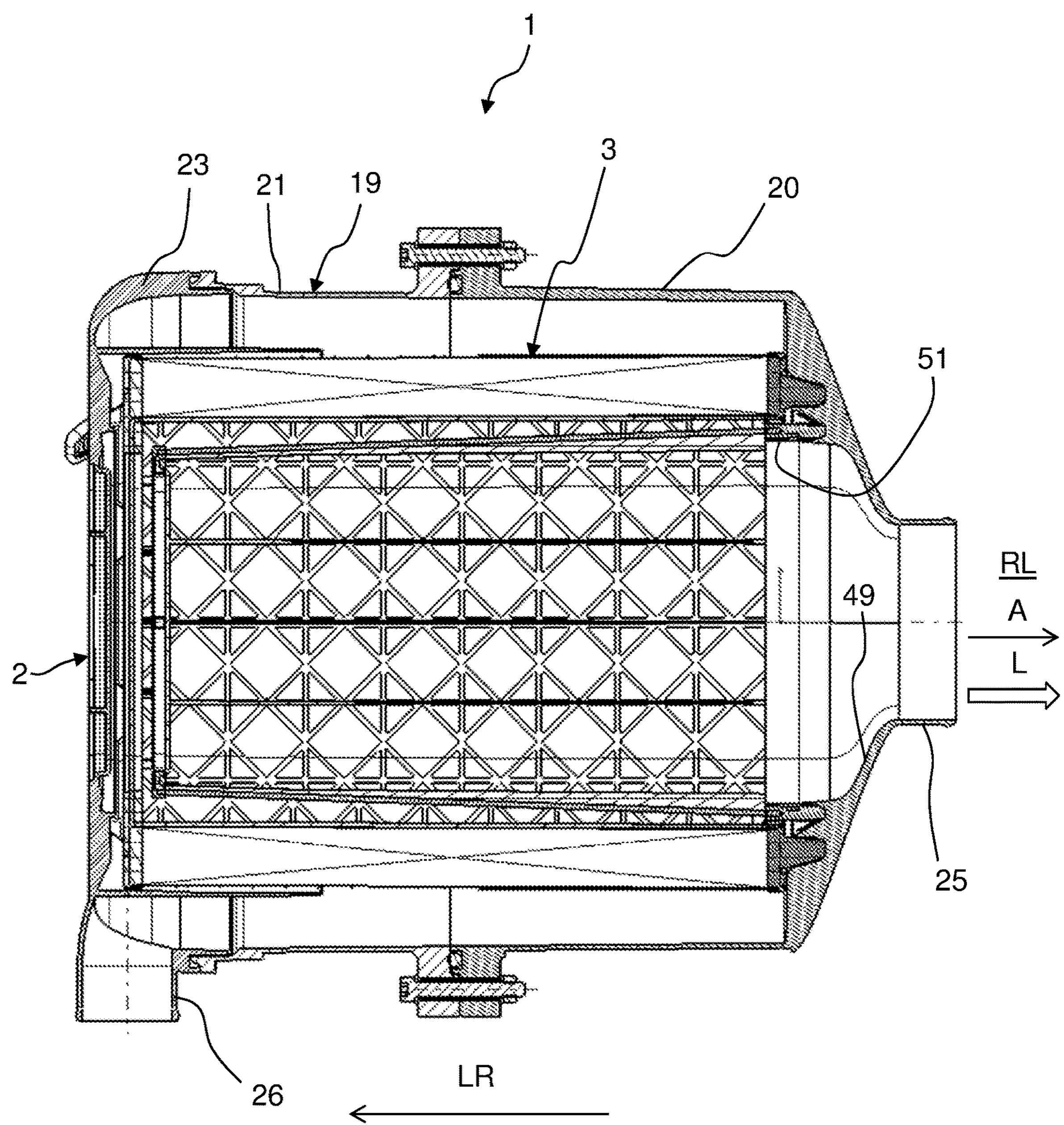
FIG. 28: shows a schematic sectional view of the filter arrangement according to FIG. 26.
Figure 29:
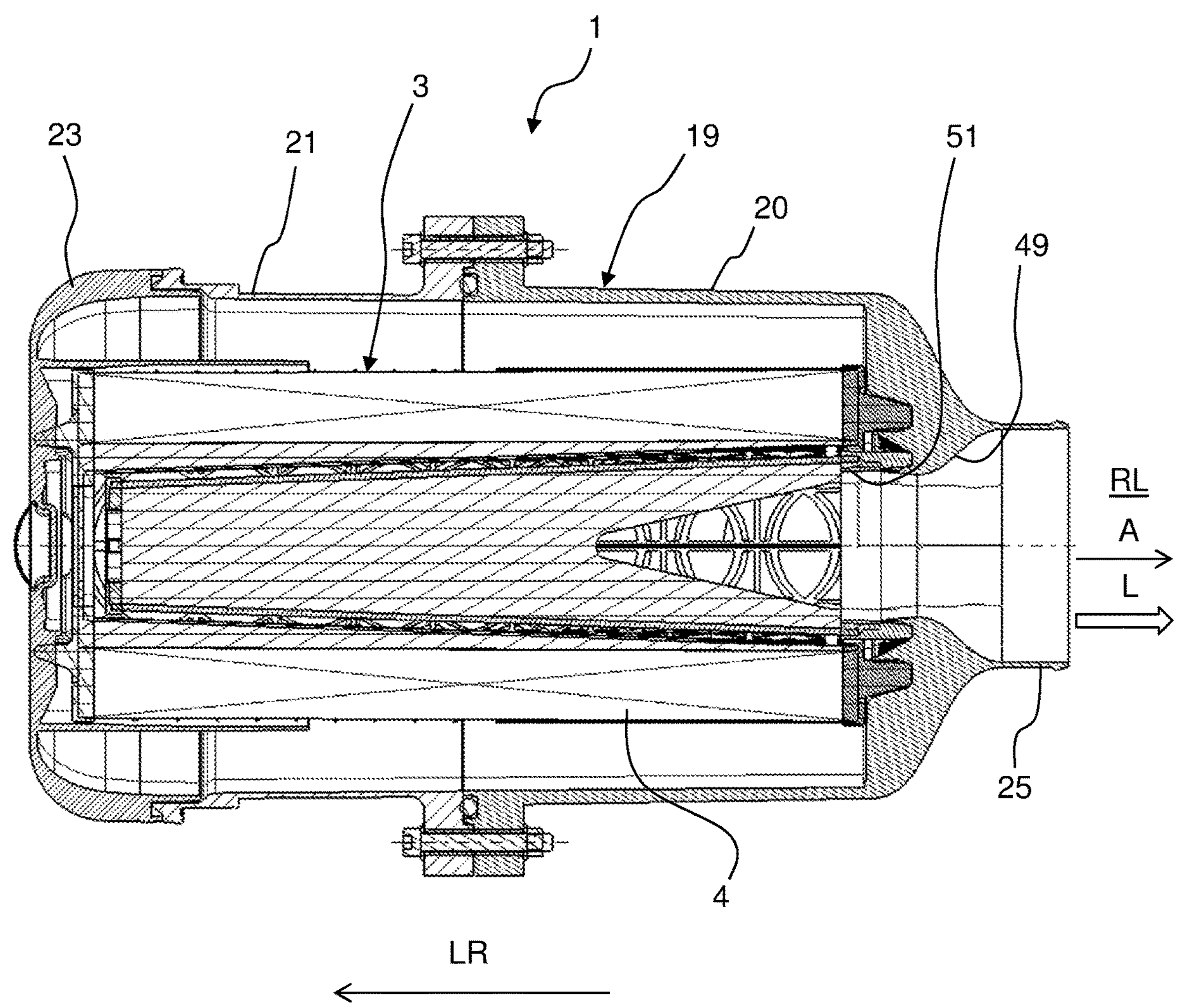
FIG. 29: shows a schematic sectional view of the filter arrangement according to FIG. 26.

As shown in FIG. 27, a fluid exit opening 51 of the filter element 3 is oval and a fluid outlet 25 of the filter receptacle 2 is circular. The fluid outlet 25 has a circular cross section facing away from the filter element 3 and an oval cross section facing toward the filter element 3. The circular cross section of the fluid outlet 25 on the side facing away from the filter element 3 preferably has a diameter that is greater than the small diameter of the oval cross section on the side of the fluid outlet 25 facing toward the filter element 3 and/or is larger than the diameter of the sealing arrangement 18 in the smaller extension (in the height direction hr). As shown in FIG. 28 and FIG. 29 in two schematic sectional views of the filter arrangement 1, a transition between the round fluid outlet 25 and the oval fluid exit opening 51 of the filter element 3 is achieved by a curved transition portion 29, which is arranged between the fluid outlet 25 and the fluid exit opening 51 of the filter element 3. An advantage of the oval geometry of the fluid exit opening 51 of the filter element 3 is the large cross-sectional area thereof. In spite of the constriction shown in FIG. 29 between the fluid outlet 25 in the fluid exit opening 51 of the filter element 3, this results only in a small disadvantageous effect on the pressure loss.

Figure 30:
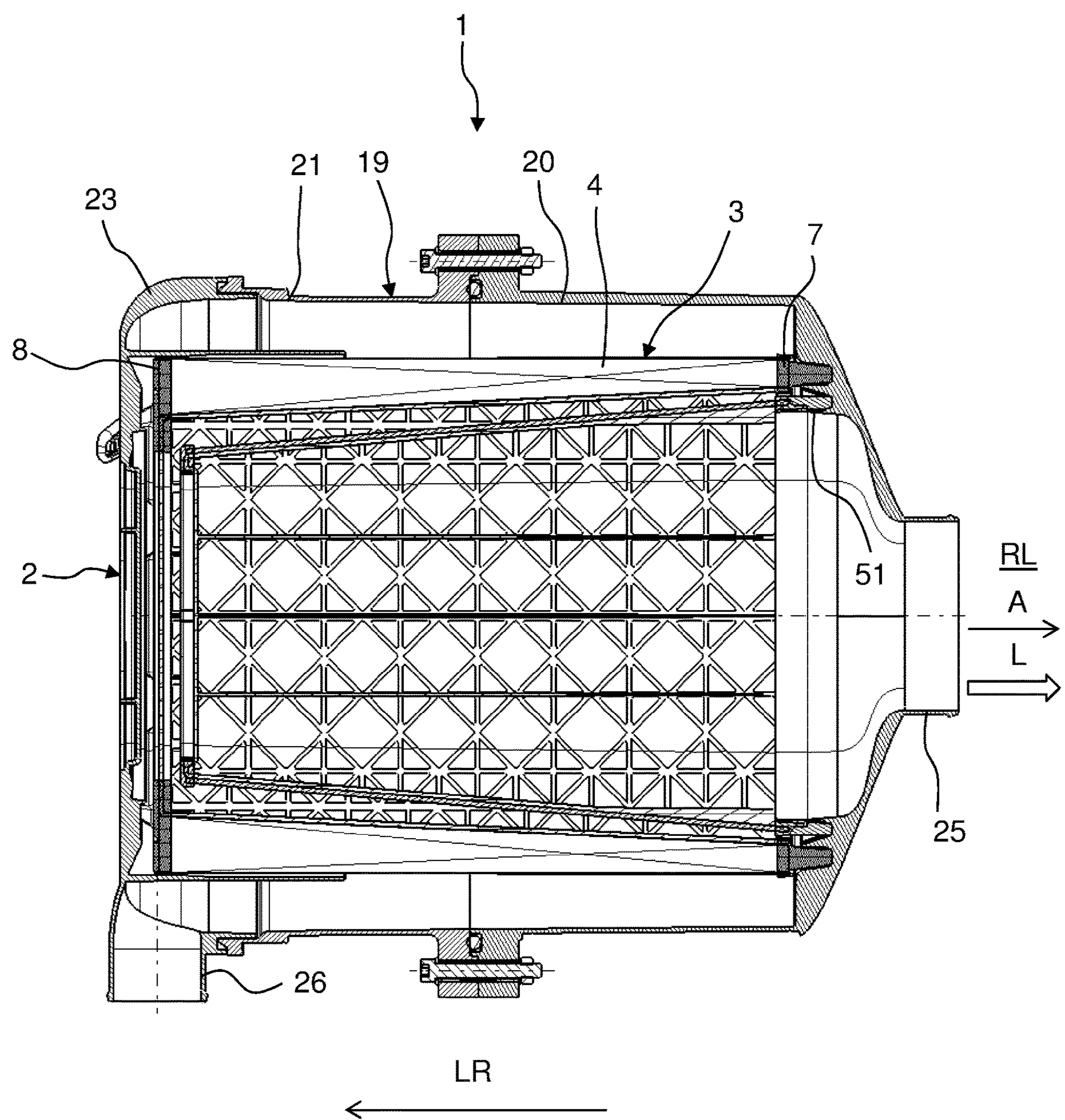
FIG. 30: shows a schematic sectional view of the filter arrangement according to FIG. 26.
Figure 31:
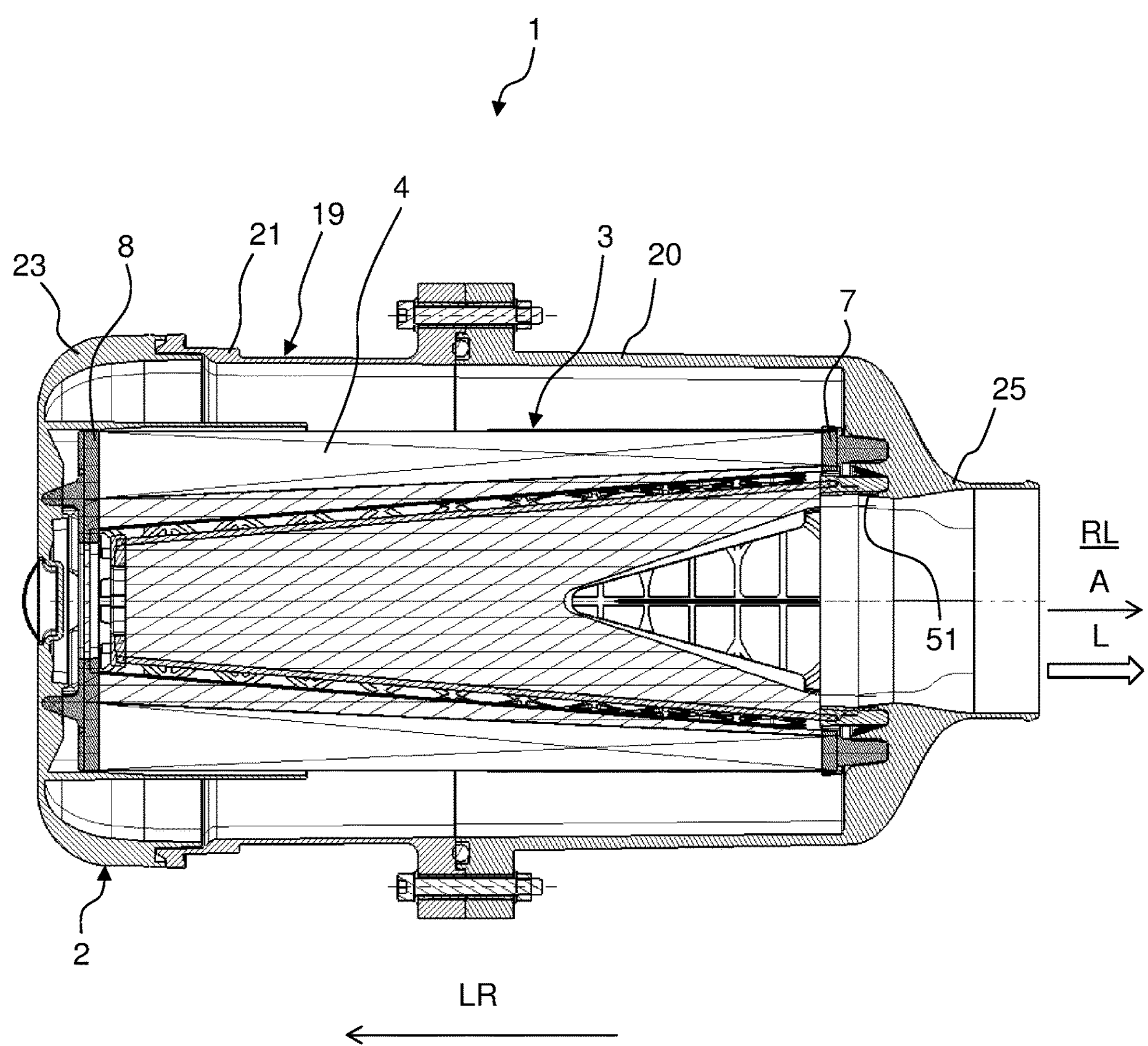
FIG. 31: shows a schematic sectional view of the filter arrangement according to FIG. 26.

The filter element 3, as shown in FIGS. 30 and 31, may also taper conically on the inner side, i.e. may have a cross section of a filter medium 4 of the filter element 3 that increases starting from a first end plate 7 in the direction of a second end plate 8 of the filter element 3. Compared with a non-conically tapering filter body 4, an enlarged fluid exit opening 51 of the filter element 3 can be achieved as a result.

USED REFERENCE SIGNS

1 filter arrangement
2 filter receptacle or filter housing
3 filter element
4 filter body
5 central tube
6 thread winding
7 end plate, in particular open end plate
8 end plate, in particular closed end plate
9 front side
10 sealing arrangement
11 receiving opening
12 incident-flow protection
13 secondary element
14 filter medium of the secondary element
15 end plate of the secondary element, in particular open
16 end plate of the secondary element, in particular closed
17 central tube of the secondary element
18 seal arrangement of the secondary element
19 receiving portion of the filter receptacle
20 housing part
21 housing part
22 fastening means
23 maintenance cover
24 fluid inlet
25 fluid outlet
26 particle discharge opening
27 engagement region, in particular for the sealing arrangement 10 of the filter element 3
28 engagement region, in particular for the sealing arrangement 18 of the secondary element 13
24 lateral surface, in particular of the filter body
30 wall, in particular of the receiving portion 19
31 wall, in particular for flow guidance within the filter receptacle
32 arrow, in particular in the direction of flow around the filter element 3
33 particles
34 bracing element
35 curvature portion, in particular of smaller curvature
36 curvature portion, in particular of smaller curvature
37 straight line
38 curvature portion, in particular of greater curvature
39 curvature portion, in particular of greater curvature
40 straight line, in particular short central straight line
41 outer contour, in particular of the sealing arrangement 10
42 outer contour, in particular of the end plate 7 and/or 8
43 inner surface, in particular of the sealing arrangement 10, in particular sealing surface
44 sealing lip, in particular with radially inner sealing edge or sealing surface 4
45 sealing lip, in particular with radially outer or inner sealing edge or sealing surface
46 cavity, in particular groove between the sealing lips 44, 45
47 guide element
48 incident-flow protection, in particular on the maintenance cover 23
49 transition portion, in particular at the fluid inlet 24
50 curvature
51 fluid exit opening, in particular through the end plate 15 of the secondary element 13
270 seal bearing surface of the engagement region 27
280 seal bearing surface of the engagement region 28
a distance
A outflow direction
$a_{37}$ length
$a_{40}$ length
b width
br width direction
E inflow direction
h height
hr height direction
L fluid
LR longitudinal direction
MA central axis
M35 curvature center point
M36 curvature center point
M38 curvature center point
M39 curvature center point
RE clean side
RO dirty side
R35 radius of curvature
R36 radius of curvature
R38 radius of curvature
R39 radius of curvature
u periphery
UL region of overlao
VK comparison curve
α angle of curvature

The invention claimed is:

1. An oval filter receptacle for a filter element (3) that, transversely to a longitudinal direction (LR) of the oval filter receptacle has an oval cross section, the oval filter receptacle comprising:

a receiving portion (19) configured to receive the filter element (3) and through which a fluid can flow radially;

a fluid inlet (24) for allowing fluid to be filtered (L) into the oval filter receptacle (2); and a fluid outlet (25) for discharging the fluid (L) filtered with the aid of the filter element (3) from the oval filter receptacle (2);

wherein the fluid outlet (25) is arranged such that an outflow direction (A) of the filtered fluid (L) from the fluid outlet (25) is oriented parallel to the longitudinal direction (LR) of the filter element (3); and wherein the fluid outlet (25) has a circular cross section facing away from the filter element (3) and an oval cross section facing toward the filter element (3);

wherein the circular cross section and the oval cross section of the fluid outlet (25) have the same cross-sectional area.

2. The oval filter receptacle as claimed in claim 1, wherein the fluid outlet (25) has a curved transition portion (49), which connects the circular cross section of the fluid outlet (25) to the oval cross section of the fluid outlet (25).

3. The oval filter receptacle as claimed in claim 2, wherein the fluid outlet (25) widens in a width direction (br) of the filter element (3) from the circular cross section to the oval cross section.

4. The oval filter receptacle as claimed in claim 2, wherein the fluid outlet (25) narrows in a height direction (hr) of the filter element (3) from the circular cross section to the oval cross section.

5. The oval filter receptacle as claimed in claim 1, wherein the oval filter receptacle (2) has a tubular incident-flow protection (48), configured to receive the filter element (3), at least in part.

6. The oval filter receptacle as claimed in claim 5, wherein the oval filter receptacle further comprises:

a maintenance cover (23) closing off an axial end of the receiving chamber of the receiving portion, wherein the maintenance cover has a particle discharge opening (26) for discharging particles centrifugally separated in oval filter receptacle;

wherein the incident-flow protection (48) is integrally formed with the maintenance cover (23), the incident-flow protection (48) arranged radially over the tubular particle discharge opening (26), wherein the maintenance cover (23) is configured as removable from the filter receptacle (2).

7. A filter arrangement (1) including:

an oval filter receptacle (2) as claimed in claim 1; and a filter element (3) that, transversely to a longitudinal direction (LR) thereof, has an oval cross section, the filter element comprising:

a first end plate (7);

a second end plate (8), and a hollow oval filter medium (3) arranged between the first end plate (7) and the second end plate (8);

wherein the hollow oval filter medium (3) has a cross section having a radial width measured from a radial interior of the hollow oval filter medium (3) to a radial exterior of the hollow oval filter medium (3);

wherein the cross section of the hollow oval filter medium (3) at the second end plate (8) is larger than a cross section of the filter medium (3) at the first end plate (7) such that a radial width of the cross section of a hollow oval filter medium increases starting from the first end plate (7) in a direction towards the second end plate (8);

wherein the filter element is received in a receiving portion (19) of the filter receptacle (2).

* * * * *